United States Patent [19]

[11] 4,255,509

[45] Mar. 10, 1981

[54] PHOTOGRAPHIC LIGHT-SENSITIVE SHEET FOR THE COLOR DIFFUSION TRANSFER PROCESS

[75] Inventors: Shigetoshi Ono; Tooru Harada; Shinsaku Fujita; Yoshinobu Yoshida, all of Minami-ashigara, Japan

[73] Assignee: Fuji Photo Film Co., Ltd., Minami-ashigara, Japan

[21] Appl. No.: 47,619

[22] Filed: Jun. 11, 1979

[30] Foreign Application Priority Data

Jun. 9, 1978 [JP] Japan ................................ 53-69488

[51] Int. Cl.³ .......................... G03C 1/40; G03C 1/10
[52] U.S. Cl. .................................. 430/216; 430/223; 430/562
[58] Field of Search ............... 96/29 D, 77, 99; 430/216, 223, 225, 562

[56] References Cited

U.S. PATENT DOCUMENTS

| 3,236,645 | 2/1966 | Husek et al. | 96/29 D |
| 3,932,381 | 1/1976 | Haase et al. | 96/29 D |
| 3,954,476 | 5/1976 | Krutak et al. | 96/77 |
| 4,055,428 | 10/1977 | Koyama et al. | 96/77 |

Primary Examiner—Richard L. Schilling
Attorney, Agent, or Firm—Sughrue, Rothwell, Mion, Zinn and Macpeak

[57] ABSTRACT

A photographic light-sensitive sheet for the color diffusion transfer process which comprises a support having thereon at least one light-sensitive silver halide emulsion layer having associated therewith a compound represented by the following general formula (1):

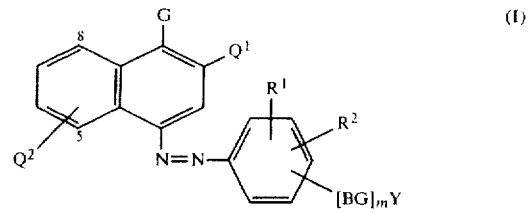

wherein $Q^1$ represents a hydrogen atom; a halogen atom; a sulfamoyl group represented by the formula $-SO_2NR^3R^4$ wherein $R^3$ represents a hydrogen atom, or an alkyl group, m represents 0 or 1, $R^4$ represents a hydrogen atom or $R^{4a}$ wherein $R^{4a}$ represents an alkyl group, an aralkyl group or a phenyl group, and $R^3$ and $R^4$ may combined directly or through an oxygen atom to form a ring; a group represented by the formula $-SO_2R^5$ wherein $R^5$ represents an alkyl group or an aralkyl group; a carboxy group; a group represented by the formula $-COOR^6$ wherein $R^6$ represents an alkyl group or a phenyl group; or a group represented by the formula $-CONR^3R^4$ wherein $R^3$ and $R^4$ each has the same meaning as defined above; $Q^2$ is positioned at the 5- or the 8-position to the G group and represents a hydroxy group, a group represented by the formula $-NHCOR^{4a}$ or a group represented by the formula $-NHSO_2R^{4a}$ wherein $R^{4a}$ has the same meaning as defined above; $R^1$ and $R^2$, which may be the same or different, each represents an alkyl group or an alkoxy group; BG is a bridging group; Y represents a redox center which functions to release a diffusible dye as a result of self cleavage upon oxidation; and G represents a hydroxyl group, a salt thereof, or a hydrolyzable acyloxy group represented by the formula

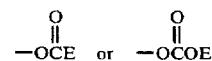

wherein E represents an alkyl group or an aryl group. The compound is a dye image providing material which provides a magenta dye image having superior properties.

26 Claims, No Drawings

PHOTOGRAPHIC LIGHT-SENSITIVE SHEET FOR THE COLOR DIFFUSION TRANSFER PROCESS

BACKGROUND OF THE INVENTION

1. Field of the Invention

The present invention relates to a photographic light-sensitive sheet for the color diffusion transfer process and, more particularly, to a silver halide photographic light-sensitive sheet for the color diffusion transfer process containing a dye releasing redox compound (hereafter DRR compound) having a novel redox moiety.

2. Description of the Prior Art

Color diffusion transfer color image forming processes using a dye releasing redox compound are described in Japanese Patent Applications (OPI) 33826/1973, 114424/1974, 126331/1974, 126332/1974, 115528/1975 and 104343/1976, U.S. Pat. Nos. 3,928,312, 3,931,144, 3,954,476 and *Research Disclosure*, No. 13024 (1975) and 196475 (1977). The term "dye releasing redox compound" means a compound containing therein a group referred to as a redox moiety and a dye or a dye precursor moiety. The redox moiety renders the redox compound immobile due to a ballast group attached thereto, but by an oxidation reduction (redox) reaction under alkaline conditions the compound splits and releases a compound having the dye moiety (a dye compound). For instance, when a light-sensitive element having a light-sensitive silver halide emulsion layer and a dye-releasing redox compound associated therewith is exposed and developed with an alkaline processing solution, the redox moiety per se is oxidized in proportion to the amount of developed silver halide and the compound splits into a compound having a dye moiety and a nondiffusible quinone compound with the alkaline processing solution. As a result, the compound having a dye moiety diffuses into an image-receiving layer to provide a transferred image therein.

Examples of dye-releasing redox compounds which release magenta dyes are described in Japanese Patent Applications (OPI) 115528/1975 and 114424/1974, U.S. Pat. Nos. 3,932,380 and 3,931,144, etc. However, technical problems are encountered using these magenta dye releasing redox compounds specifically described in such prior art, in that the transferred color images have insufficient stability (for example, the light fastness of the images is insufficient and the images fade to a large extent even in a dark place) and in that the transfer of the dye compound is not adequate.

For instance, with respect to the fading-in-dark of transferred images, it has been known that when a polymer acid such as polyacrylic acid, a copolymer of acrylic acid and butyl acrylate, etc., as disclosed in U.S. Pat. No. 3,362,819 hereinafter described, is used in a neutralizing layer, adversely influences to the fading of transferred color images. It has also been found upon further investigation that unreacted butyl acrylate monomer exceptionally degrades magenta color images obtained from prior art dye-releasing redox compounds such as described in U.S. Pat. No. 3,932,380. However, it is extremely difficult from a technical standpoint to limit the amount of unreacted monomer during the synthesis of polymer acid for a neutralizing layer to an extent that it does not adversely influence the fastness of the images. Therefore, it has been desired to develop a redox compound which releases a dye compound which is less sensitive to such a monomer.

SUMMARY OF THE INVENTION

A first object of the present invention is to provide a dye releasing redox compound which provides a stable magenta dye image.

A second object of the present invention is to provide a dye releasing redox compound having a dye moiety whose color hue is excellent.

A third object of the present invention is to provide a dye releasing redox compound which provides a transferred color image which does not change hue with pH.

A fourth object of the present invention is to provide a photographic light-sensitive sheet for the color diffusion transfer process containing a dye releasing redox compound which provides a transferred magenta dye image having a sufficiently high optical density in the presence of a relatively small amount of silver halide.

A fifth object of the present invention is to provide a so-called "negative utilizable" photographic light-sensitive sheet for the color diffusion transfer process in which a light-sensitive element is also utilized.

Various investigations have led to the finding that the above-described objects are effectively attained by a photographic light-sensitive sheet with satisfactory photographic properties for the color diffusion transfer process which contains a dye releasing redox compound represented by the formula (I):

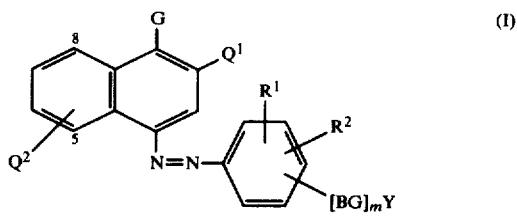

wherein $Q^1$ represents a hydrogen atom; a halogen atom; a sulfamoyl group represented by the formula $-SO_2NR^3R^4$ wherein $R^3$ represents a hydrogen atom or an alkyl group, $R^4$ represents a hydrogen atom or $R^{4a}$ wherein $R^{4a}$ represents an alkyl group, an aralkyl group or a phenyl group, and $R^3$ and $R^4$ may combine directly or through an oxygen atom to form a ring; a group represented by the formula $-SO_2R^5$ wherein $R^5$ represents an alkyl group or an aralkyl group; a carboxy group; a group represented by the formula $-COOR^6$ wherein $R^6$ represents an alkyl group or a phenyl group; or a group represented by the formula $-CONR^3R^4$ wherein $R^3$ and $R^4$ each has the same meaning as defined above; $Q^2$ is positioned at the 5- or the 8-position to the G group and represents a hydroxy group, a group represented by the formula $-NHCOR^{4a}$ or a group represented by the formula $-NHSO_2R^{4a}$ wherein $R^{4a}$ has the same meaning as defined above; $R^1$ and $R^2$, which may be the same or different, each represents an alkyl group, or an alkoxy group; BG represents a bridging group; m represents 0 or 1; Y represents a redox center which functions to release a diffusible dye as a result of self cleavage upon oxidation; and G represents a hydroxyl group, a salt thereof, or a hydrolyzable acyloxy group represented by the formula

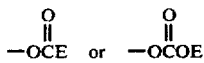

wherein E represents an alkyl group or an aryl group.

DETAILED DESCRIPTION OF THE INVENTION

In the above-described general formula, the compound is characterized by the presence of the $R^1$ and $R^2$ groups in the dye moiety, more particularly the moiety corresponding to the diazo component. Due to the co-presence of the these two electron donating groups, it is observed that the fading-in-dark of transferred images hereinafter described is exceptionally prevented and thus the storage stability of color images in a dark place is extremely improved. The improved storage stability of color images in a dark place is not observed where at least one of $R^1$ and $R^2$ is a hydrogen atom.

In more detail, $R^1$ and $R^2$ are the same or different and each represents an alkyl group including a substituted alkyl group or an alkoxy group including a substituted alkoxy group. Of these groups, those having 1 to 6 carbon atoms in the alkyl moiety are preferred. Particularly preferred examples of $R^1$ and $R^2$ include a methyl group, an ethyl group, a methoxy group, an ethoxy group and a methoxyethoxy group. From the standpoint of the availability of starting materials to produce the dye releasing redox compound and in view of diffusion rate of the released dye, a methyl group and a methoxy group are particularly advantageous for $R^1$ and $R^2$. A total number of carbon atoms included in $R^1$ and $R^2$ is more than 12 is undesirable since the diffusion rate of released dye is small.

$Q^1$ represents a hydrogen atom; a halogen atom; a sulfamoyl group represented by the formula $-SO_2NR^3R^4$ wherein $R^3$ represents a hydrogen atom or an alkyl group including a substituted alkyl group, $R^4$ represents a hydrogen atom or $R^{4a}$ wherein $R^{4a}$ represents an alkyl group including a substituted alkyl group, an aralkyl group including a substituted aralkyl group, a phenyl group or a substituted phenyl group, and $R^3$ and $R^4$ may combine directly or through an oxygen atom to form a ring; a group represented by the formula $-SO_2R^5$ wherein $R^5$ represents an alkyl group including a substituted alkyl group or an aralkyl group; a carboxy group; a group represented by the formula $-COOR^6$ wherein $R^6$ represents an alkyl group including a substituted alkyl group or a phenyl group including a substituted phenyl group; or a group represented by the formula $-CONR^3R^4$ wherein $R^3$ and $R^4$ each has the same meaning as defined above; $Q^2$ is positioned at the 5- or the 8-position to the G group and represents a hydroxy group, a group represented by the formula $-NHCOR^{4a}$ or a group represented by the formula $-NHSO_2R^{4a}$ wherein $R^{4a}$ has the same meaning as defined above.

In the sulfamoyl group represented by the formula $-SO_2NR^3R^4$ for $Q^1$, $R^3$ is preferably a hydrogen atom, an alkyl group having 1 to 8 carbon atoms (more preferably 1 to 4 carbon atoms), or a substituted alkyl group having 1 to 8 carbon atoms (more preferably 1 to 4 carbon atoms) in the alkyl moiety. $R^4$ is preferably a hydrogen atom, or an $R^{4a}$ group where $R^{4a}$ represents a straight or branched chain alkyl group having 1 to 8 carbon atoms (more preferably 1 to 4 carbon atoms) including a substituted alkyl group having 1 to 8 carbon atoms (more preferably 1 and 4 carbon atoms) in the alkyl moiety, an aralkyl group having 7 to 12 and preferably 7 to 9 carbon atoms (for example a benzyl group), including a substituted aralkyl group or a phenyl group including a substituted phenyl group having 6 to 9 carbon atoms. Also, $R^3$ and $R^4$ may be combined directly or through an oxygen atom to form a 5- or 6-membered ring. The cases where: (1) $R^3$ and $R^4$ each represents a hydrogen atom and (2) one of $R^3$ and $R^4$ represents a hydrogen atom and the other of $R^3$ and $R^4$ represents an alkyl group having 1 to 4 carbon atoms, are particularly preferred in view of the availability of the starting materials and excellent transferability of the dye compound formed. The same is true for the $-CONR^3R^4$ group.

With respect to the $-SO_2R^5$ group, $R^5$ preferably represents a straight or branched chain alkyl group having 1 to 8 carbon atoms including a substituted alkyl group having 1 to 8 carbon atoms in the alkyl moiety or an aralkyl group having 7 to 12 preferably 7 to 9 carbon atoms. In particular, an alkyl group having 1 to 4 carbon atoms and a benzyl group are preferred in view of the availability of the starting materials and excellent transferability of the dye compound formed.

In case of the $-COOR^6$ group, $R^6$ preferably represents an alkyl group having 1 to 8 carbon atoms (more preferably 1 to 4 carbon atoms) including a substituted alkyl group having 1 to 8 carbon atoms (more preferably 1 to 4 carbon atoms) in the alkyl moiety, or a phenyl group including a substituted phenyl group having 6 to 9 carbon atoms.

Examples of suitable substituents which can be present in the above-described substituted alkyl groups represented by $R^3$ and $R^6$ include one or more of a cyano group, a $C_1$-$C_2$ alkoxy group, a hydroxy group, a carboxy group, a sulfo group, a halogen atom, an amino group, a carbamoyl group, a sulfamoyl group, etc. Further, examples of suitable substituents which can be present in the above-described substituted phenyl group represented by $R^{4a}$ and $R^6$ include one or more of an alkyl group having 1 to 2 carbon atoms, a carbamoyl group, a cyano group, an alkoxy group, a hydroxy group, a halogen atom, a carboxy group, a sulfo group, a sulfamoyl group, etc. Preferred examples of suitable substituents for the substituted aralkyl group $R^{4a}$ includes an alkyl group having 1 to 2 carbon atoms, an alkoxy group having 1 to 3 carbon atoms, a halogen atom, a cyano group, a carbamoyl group and a sulfamoyl group.

The bridging group BG is preferably represented by the formula (II)

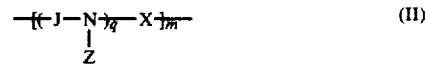

where m and q represents 0 or 1; X represents a divalent connecting group represented by the formula $-A_1-(L)_n-(A_2)_p-$ wherein $A_1$ and $A_2$, which may be the same or different, each represents an alkylene group having 1 to 8 and preferably 1 to 4 carbon atoms, an aralkylene group having 7 to 12 and preferably 7 to 10 carbon atoms or an arylene group having 6 to 9 carbon atoms which may be substituted with an alkoxyalkoxy group; L represents a divalent group selected from an oxy group, a carbonyl group, a carbonamido group, a carbamoyl group, a sulfonamido group, a sulfamoyl group and a sulfonyl group; and n and p, which may be the same or different, each represents 0 or 1.

J represents a divalent group selected from a sulfonyl group and a carbonyl group. A sulfonyl group is preferred.

Z represents a hydrogen atom, an alkyl group having 1 to 8 and preferably 1 to 4 carbon atoms including a substituted alkyl group (representative substituents include a halogen atom, an alkoxy group, a hydroxy group, a cyano group, etc.). A hydrogen atom is preferred.

E represents a straight-chain, branched chain or cyclic substituted or unsubstituted alkyl group having 1 to 8 carbon atoms (preferably 1 to 4 carbon atoms) or a substituted or unsubstituted aryl group (preferably a mono-cyclic group). The substituent for the alkyl group includes an alkoxy group, a halogen atom, a cyano group and the like. The substituent for the aryl group includes an alkoxy group, a halogen atom, a cyano group, a nitro group, a hydroxy group, a carboxy group, an ester group, a carbonamido group and the like.

More preferably, q is 0 and the Y-X group represents Y—alkylene—$SO_2$—, Y—$C_6H_4CH_2$—$SO_2$— or Y—arylene—$SO_2$—. The arylene group described above includes a phenylene group and a phenylene group substituted by one or more of an alkyl group, an alkoxy group, an alkoxyalkoxy group, etc.

Specific representative examples of $A_1$ and $A_2$ are —$CH_2CH_2$—,

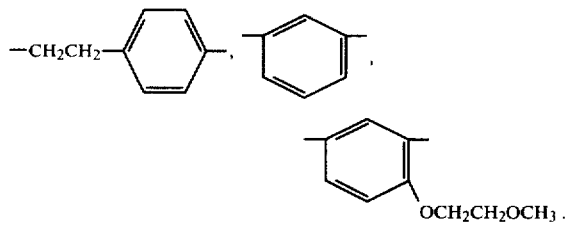

The compound represented by the formula (I) wherein m is 0 is particularly preferred in view of the diffusion rate of a released dye. The bridging group [BG] can be either present of absent, i.e., m is 1 or 0.

Y represents a redox center which functions to release a diffusible dye as a result of self cleavage upon oxidation such as a sulfamoyl group substituted with an o- or p-hydroxyaryl group (i.e., an o- or p-hydroxyarylsulfamoyl group) having a ballast group bonded thereto. A group represented by the general formula (III) is preferable.

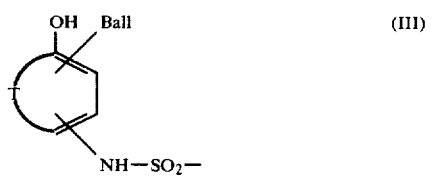

wherein Ball represents a ballast group; T represents the carbon atoms necessary to complete a benzene ring, including a substituted benzene ring or a naphthalene ring including a substituted naphthalene ring; the —$NHSO_2$— group is present at the o- or p-position to the hydroxy group; and when T represents the atoms necessary to complete a naphthalene ring, Ball can be bonded to either of the two rings.

Examples of suitable substituents which can be present on the benzene ring or the naphthalene ring include, for example, an alkyl group (preferably an alkyl group having 1 to 7 carbon atoms), a halogen atom (such as a chlorine atom, etc.), etc.

The ballast group is an organic ballast group capable of rendering the dye-releasing redox compound non-diffusible during development in an alkaline processing solution and preferably contains a hydrophobic residue having 8 to 40 carbon atoms. This organic ballast group can be bonded to the dye-releasing redox compound directly or through a linking group, for example, an imino bond, an ether bond, a thioether bond, a carbonamido bond, a sulfonamido bond, a ureido bond, an ester bond, an imido bond, a carbamoyl bond, a sulfamoyl bond, etc.

Specific examples of ballast groups are illustrated below.

An alkyl group or an alkenyl group (for example, a dodecyl group, an octadecyl group, etc.), an alkoxyalkyl group (for example, a 3-(octyloxy)propyl group, a 3-(2-ethylundecyloxy)propyl group, etc., as described in Japanese Patent Publication No. 27563/1964, etc.), an alkylaryl group (for example, a 4-nonylphenyl group, a 2,4-di-tert-butylphenyl group, etc.), an alkylaryloxyalkyl group (for example, a 2,4-di-tert-pentylphenoxymethyl group, an α-(2,4-di-tert-pentylphenoxy)propyl group, a 1-(3-pentadecylphenoxy)-ethyl group, etc.), an acylamidoalkyl group (for example, a group described in U.S. Pat. Nos. 3,337,344 and 3,418,129, a 2-(N-butylhexadecanamido)ethyl group, etc.), an alkoxyaryl or aryloxyaryl group (for example, a 4-(n-octadecyloxy)-phenyl group, a 4-(4-n-dodecylphenyloxy)phenyl group, etc.), a residue containing both an alkyl or alkenyl long-chain aliphatic group and a water solubilizing group such as a carboxy group or a sulfo group (for example, a 1-carboxy-methyl-2-nonadecenyl group, a 1-sulfoheptadecyl group, etc.), an alkyl group substituted with an ester group (for example, a 1-ethoxycarbonylheptadecyl group, a 2-(n-dodecyloxycarbonyl)-ethyl group, etc.), an alkyl group substituted with an aryl group or a heterocyclic group (for example, a 2-[4-(3-methoxycarbonylheneicosanamido)phenyl]-ethyl group, a 2-[4-(2-n-octadecylsuccinimido)phenyl]ethyl group, etc.), and an aryl group substituted with an aryloxyalkoxy-carbonyl group (for example, a 4-[2-(2,4-di-tert-pentylphenoxy)-2-methylpropyloxycarbonyl]phenyl group, etc.).

Of the above-described organic ballast groups, those bonded to a bridging group as represented by the following general formulae are particularly preferred.

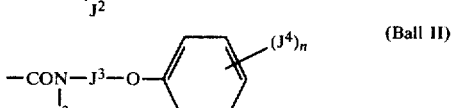

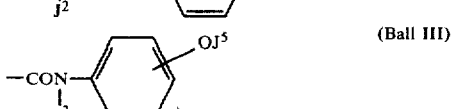

-continued

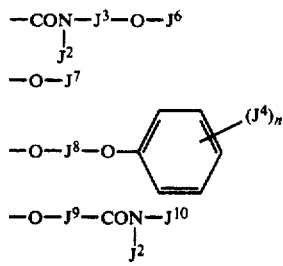

wherein J¹ represents a straight-chain or branched-chain alkyl group having 7 to 39 carbon atoms, preferably 7 to 32 carbon atoms (such as, a dodecyl group, a tetradecyl group, a hexadecyl group); J² represents a hydrogen atom or a straight-chain or branched-chain alkyl group having 1 to 39 carbon atoms, preferably 1 to 32 carbon atoms; J³ represents a straight-chain or branched-chain alkylene group having 1 to 10 carbon atoms, preferably 1 to 6 carbon atoms (such as, a propylene group, a butylene group); J⁴ represents a hydrogen atom or a straight-chain or branched-chain alkyl group having 1 to 32 carbon atoms, preferably 1 to 25 carbon atoms (such as, tert-amyl group, a pentadecyl group); J⁵ represents a straight-chain or branched-chain alkyl group having 1 to 33 carbon atoms, preferably 1 to 25 carbon atoms, or a

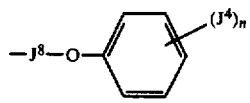

group; J⁶ represents a straight-chain or branched-chain alkyl group having 1 to 37 carbon atoms, preferably 1 to 25 carbon atoms; J⁷ represents an alkyl group having 8 to 40 carbon atoms, preferably 8 to 32 carbon atoms; J⁸ represents a straight-chain or branched-chain alkylene group having 1 to 10 carbon atoms, preferably 1 to 6 carbon atoms; J⁹ represents a straight-chain or branched-chain alkylene group having 1 to 38 carbon atoms, preferably 1 to 30 carbon atoms; J¹⁰ represents an alkyl group having 1 to 38 carbon atoms, preferably 1 to 30 carbon atoms, or a

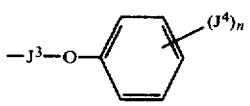

group; and n represents an integer of 1 to 5, preferably to 2.

Specific examples of the sulfamoyl groups are illustrated below:

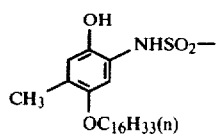

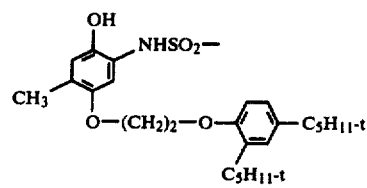

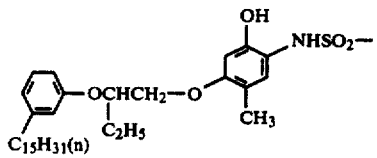

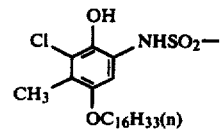

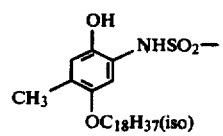

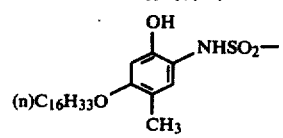

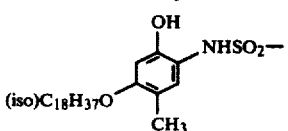

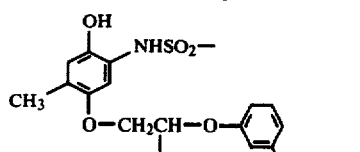

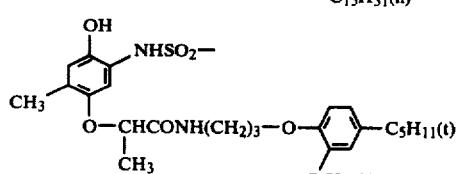

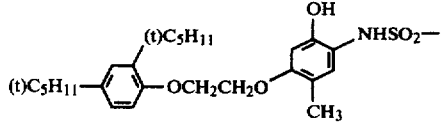

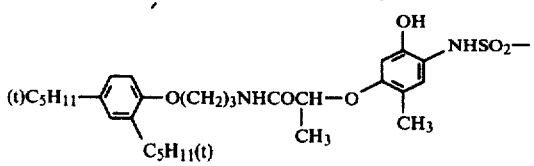

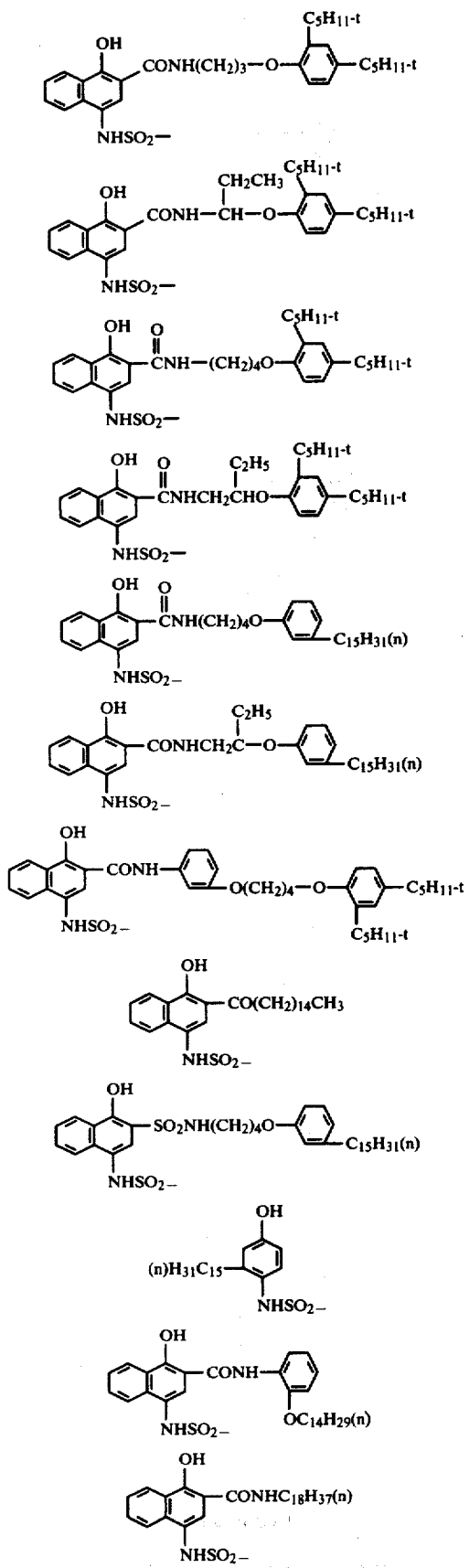

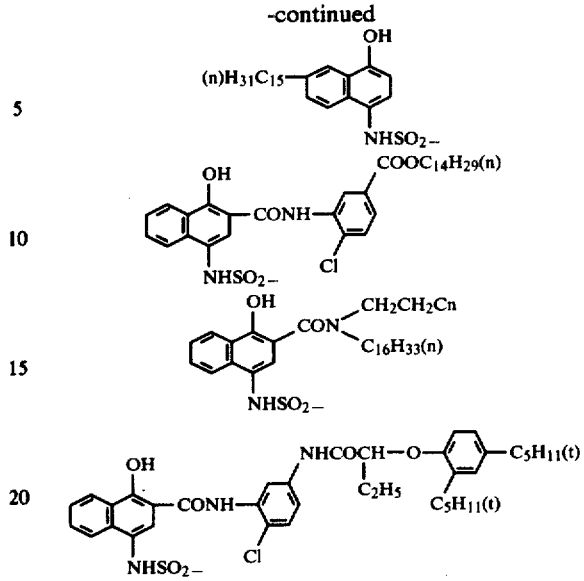

Furthermore, the groups described in *Research Disclosure*, Vol. 130, No. 13024 (February, 1975) are useful for Y.

A preferred compound according to the present invention is a compound represented by the above-described general formula (I) in which $R^1$ $R^2$, which may be the same or different, each represents an alkyl group having 1 to 4 carbon atoms, a substituted alkyl group having 1 to 4 carbon atoms in the alkyl moiety, an alkoxy group having 1 to 4 carbon atoms or a substituted alkoxy group having 1 to 4 carbon atoms in the alkyl moiety, with examples of substituents in the substituted alkyl group and the substituted alkoxy group including a cyano group, an alkoxy group, preferably an alkoxy group having 1 to 4 carbon atoms, a hydroxy group, a carboxy group, a sulfo group, etc.;

$Q^1$ represents a hydrogen atom or a sulfamoyl group represented by the formula $-SO_2NR^3R^4$, wherein $R^3$ and $R^4$, which may be the same or different, each represents a hydrogen atom, an alkyl group having 1 to 4 carbon atoms or a substituted alkyl group having 1 to 4 carbon atoms in the alkyl moiety, with examples of suitable substituents in the substituted alkyl group including a cyano group, an alkoxy group, a hydroxy group, a carboxy group, a sulfo group, etc., and also $R^3$ and $R^4$ can combine directly or through an oxygen atom to form a 5- or 6-membered ring;

$Q^2$ represents a hydroxy group or an $-NHSO_2R^{4a}$ group substituted at the 5-position, wherein $R^{4a}$ has the same meaning as defined above; q represents 0; Y—X represents a Y-alkylene-$SO_2$— group, a Y—$C_6H_4C$-$H_2$—$SO_2$— group or a Y-arylene —$SO_2$— group wherein Y represents a sulfamoyl group represented by the general formula (III); and m represents 0 or 1 and more preferably 0.

A particularly preferred compound according to the present invention is a compound represented by the above-described general formula (I), and in which $R^1$ and $R^2$, which may be the same or different, each represents a methyl group, an ethyl group, a methoxy group, an ethoxy or a methoxyethoxy group (particularly, a methyl group and a methoxy group are preferred);

$Q^1$ represents a hydrogen atom or a sulfamoyl group represented by the formula $-SO_2NR^3R^4$, wherein $R^3$ and R[4], which may be the same or different, each represents a hydrogen atom, an alkyl group having 1 to 4 carbon atoms or a substituted alkyl group having 1 to 4 carbon atoms in the alkyl moiety, with examples of suitable substituents for the substituted alkyl group including a cyano group, an alkoxy group (preferably having 1 to 4 carbon atoms), a hydroxy group, a carboxy group, a sulfo group, etc., and also R[3] and R[4] can combine directly or through an oxygen atom to form a 5- or 6-membered ring;

$Q^2$ represents a hydroxy group or an $-NHSO_2R^{4a}$ group substituted at the 5-position, wherein $R^{4a}$ has the same meaning as defined above; m represents 0; and Y represents a sulfamoyl group represented by the general formula (III).

Specific examples of dye releasing redox compounds according to the present invention are illustrated below. However, the present invention should not be construed as being limited to these specific examples.

Compound 1

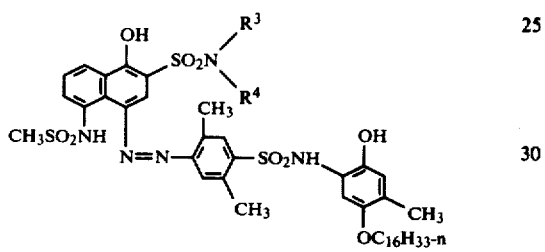

wherein R[3] is H and R[4] is $C_4H_9$—t.

Compound 2

Same compound as Compound 1 except R[3] is $C_2H_5$ and R[4] is $C_2H_5$.

Compound 3

Same compound as Compound 1 except R[3] is H and R[4] is $C_4H_9$—n.

Compound 4

Same compound as Compound 1 except R[3] is H and R[4] is H.

Compound 5

Same compound as Compound 1 except R[3] is H and R[4] is $CH_3$.

Compound 6

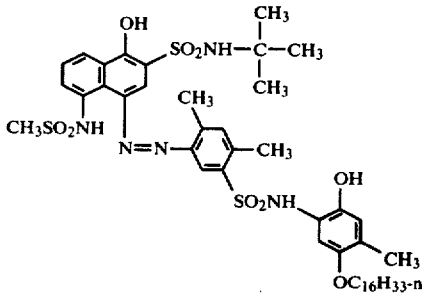

Compound 7

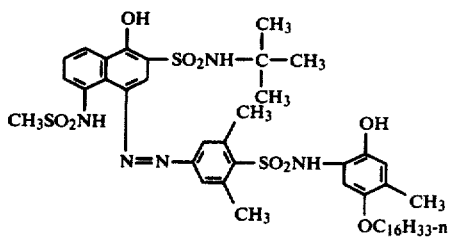

Compound 8

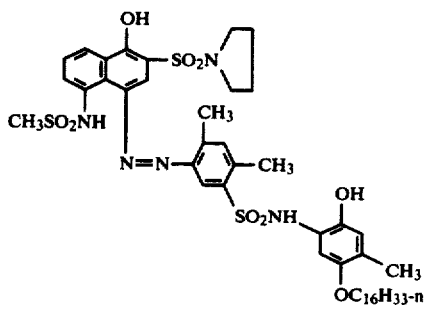

Compound 9

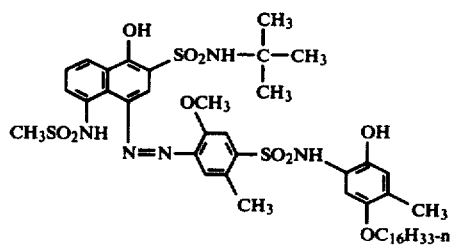

Compound 10

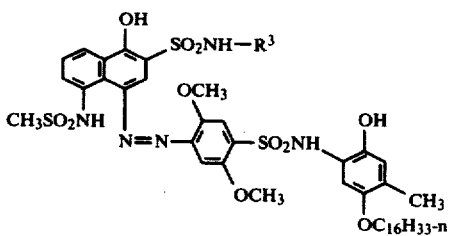

wherein R[3] is $C_4H_9$—t.

Compound 11

Same compound as Compound 10 except R[3] is $CH_3$.

Compound 12
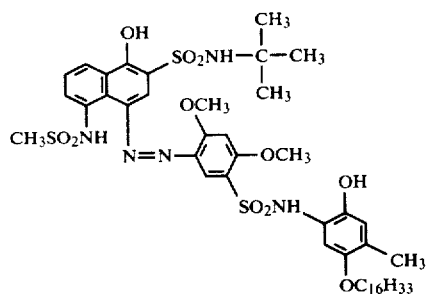
Compound 14
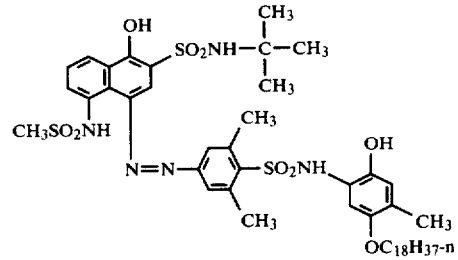
Compound 15
Compound 13
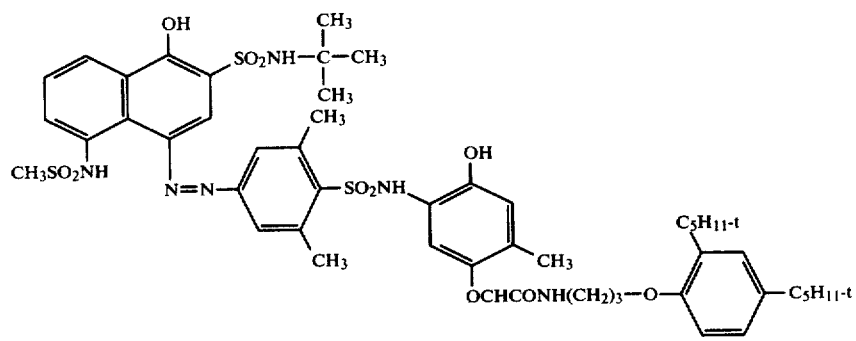
Compound 16
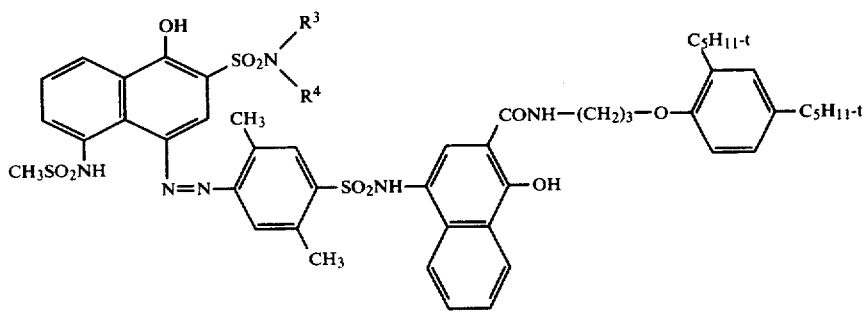
wherein $R^3$ is H and $R^4$ is $C_4H_9$—t.
Compound 17
Same compound as Compound 16 except $R^3$ is $C_2H_5$ and $R^4$ is $C_2H_5$.
Compound 18
Same compound as Compound 16 except $R^3$ is H and $R^4$ is $C_4H_9$—n.
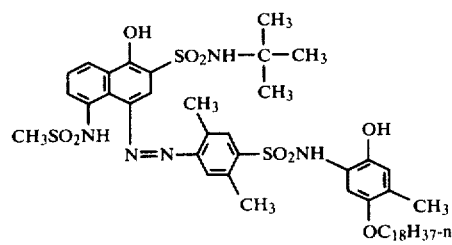

Compound 19

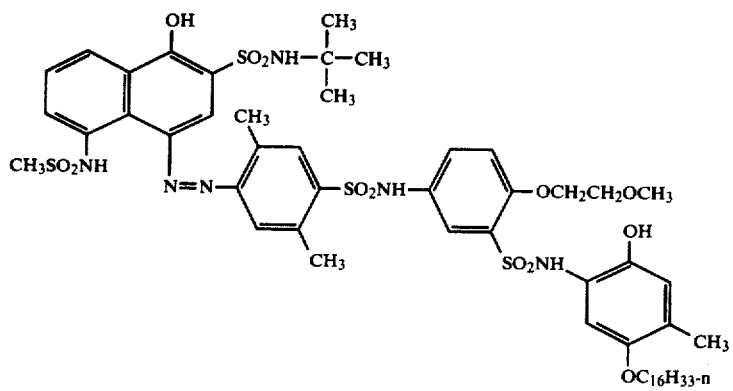

Compound 20

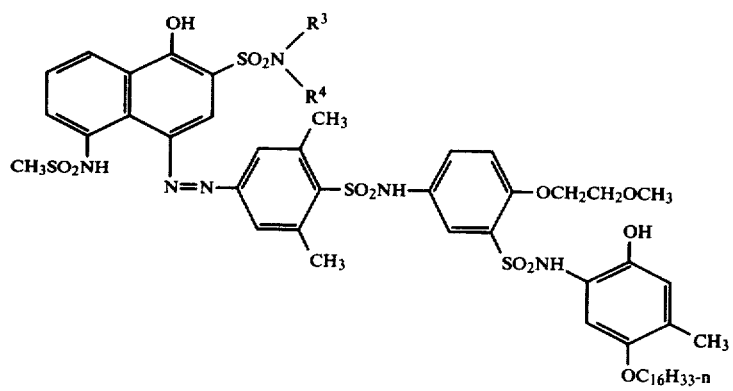

wherein R$^3$ is H and R$^4$ is C$_4$H$_9$—t.

Compound 21

Same compound as Compound 20 except R$^3$ is C$_2$H$_5$ and R$^4$ is C$_2$H$_5$.

Compound 22

Same compound as Compound 20 except R$^3$ is H and R$^4$ is C$_4$H$_9$—n.

Compound 23

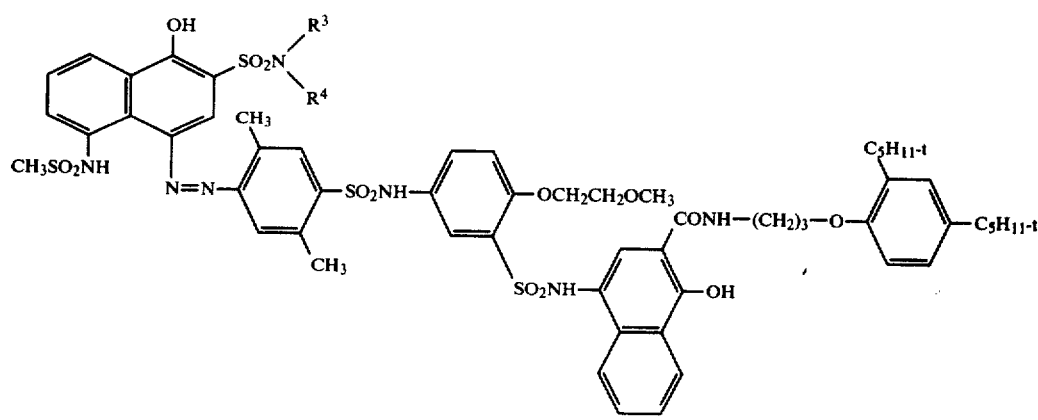

wherein R$^3$ is H and R$^4$ is C$_4$H$_9$—t.

Compound 24

Same compound as Compound 23 except R$^3$ is C$_2$H$_5$ and R$^4$ is C$_2$H$_5$.

Compound 25

Same compound as Compound 23 except R$^3$ is H and R$^4$ is C$_4$H$_9$—n.

Compound 26

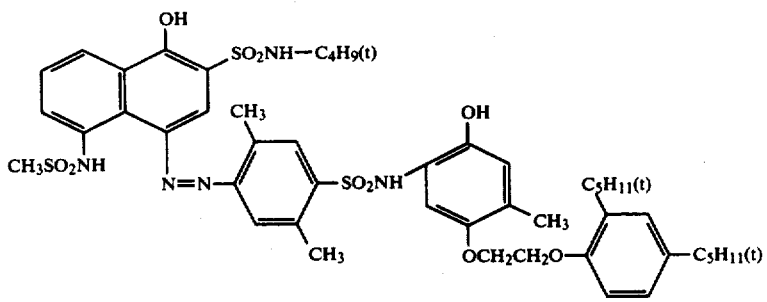

The compound according to the present invention releases a novel magenta dye compound represented by the following formula (IV) or (V):

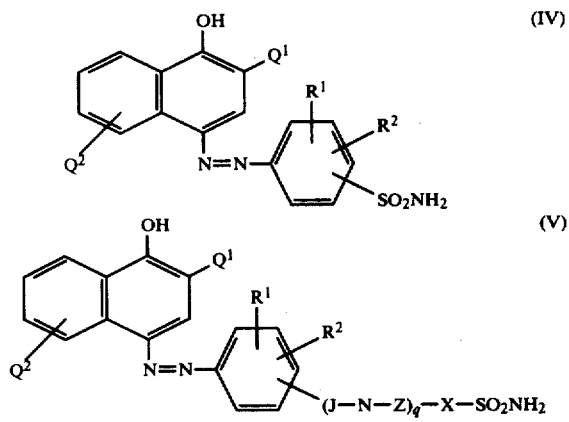

wherein $Q^1$, $Q^2$, $R^1$, $R^2$, J, Z, q and X each has the same meaning as defined in the general formula (I), when the compound is oxidized under alkaline conditions.

The compound according to the present invention can be obtained by a condensation reaction of a sulfonyl halide represented by the formula (VI) with an amine represented by the formula (VII) or (VIII):

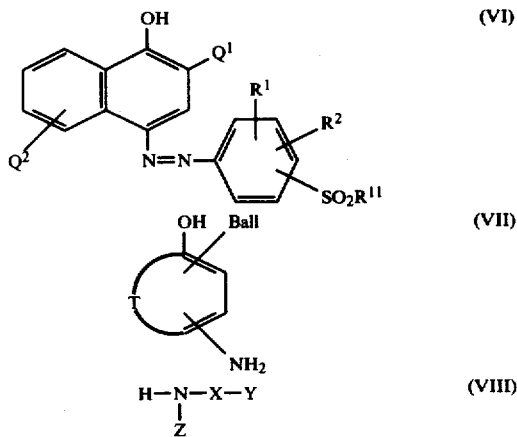

wherein $Q^1$, $Q^2$, $R^1$, $R^2$, X, Y and Z each has the same meaning as defined in the formula (I); T and Ball each has the same meaning as defined in the formula (III); and $R^{11}$ represents a halogen atom (for example, a chlorine atom, a fluorine atom, etc.).

The compound represented by the above-described general formula (I), and in which J represents a car-bonyl group can be obtained by a condensation reaction of a compound represented by the above-described general formula (VI) in which the $SO_2$ group is replaced with a CO group with an amine represented by the formula (VIII). The condensation reaction can be carried out in the same manner as the method described below using a compound represented the general formula (VI).

In general, the condensation reaction is preferably carried out in the presence of a basic compound. Examples of suitable basic compounds which can be employed include a hydroxide of an alkali metal or an alkaline earth metal (for example, sodium hydroxide, potassium hydroxide, barium hydroxide, calcium hydroxide, etc.), an aliphatic amine (for example, triethylamine, etc.), an aromatic amine (for example, N,N-diethylaniline, etc.), a heteroaromatic amine (for example, pyridine, quinoline, α-, β- or γ-picoline, lutidine, collidine, 4-(N,N-dimethylamino)pyridine, etc.), or a heterocyclic base (for example, 1,5-diazabicyclo[4,3,0]nonene-5, 1,8-diazabicyclo[5,4,0]undecene-7, etc.). A heteroaromatic amine is particularly preferred of the above-described basic compounds where a compound represented by the formula (VI) wherein $R^{11}$ is a chlorine atom, that is, a sulfonyl chloride is used.

An azo dye represented by the formula (XI) below which is required for the preparation of the compound represented by the formula (VI) can be synthesized by diazotizing an aminobenzenesulfonic acid having two electron-donating groups represented by the formula (X) and coupling it with a compound represented by the formula (XI), i.e., a coupler or a coupling component. Diazotization is carried out by adding to an alkali solution of the corresponding aminobenzenesulfonic acid a solution containing 1.1 times as many moles of sodium nitrite and hydrochloric acid. The Coupling reaction is carried out by adding alkali solution of the corresponding napthol to the above diazotizing solution. It is preferred that these reactions are carried out at a temperature of 5° C. or less. A compound represented by the formula (VI) is prepared by converting the sulfonic acid group of the azo dye to a sulfonyl halide using a halogenating agent.

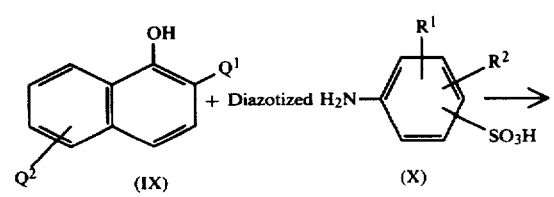

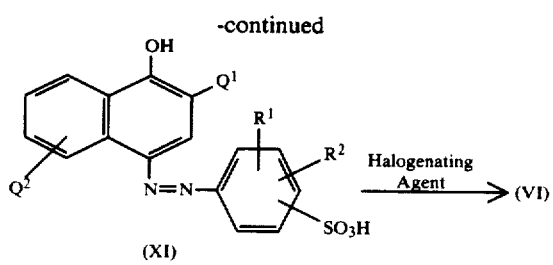

(XI)

wherein $Q^1$, $Q^2$, $R^1$ and $R^2$ each has the same meaning as defined in the formula (I).

In order to convert the compound of the formula (XI) to a compound of the formula (VI), a chlorinating agent such as phosphorus oxychloride (POCl$_3$), thionyl chloride (SOCl$_2$) or phosphorus pentachloride (PCl$_5$) is preferably used. The chlorination reaction is preferably carried out in the presence of an N,N-di-substituted carbonamide such as N,N-dimethylacetamide, N,N-dimethylformamide, N-methylpyrrolidone, etc., as a catalyst.

Typical examples of the amine represented by the formula (VII) are described, for example, in Japanese Patent Applications (OPI) 113624/1976, 115528/1975 and 114424/1974, U.S. Pat. Nos. 3,932,380 and 3,931,144 and Research Disclosure, Vol. 130, No. 13024.

A typical method for the preparation of the amine represented by the formula (VIII) is schematically illustrated below.

Process I

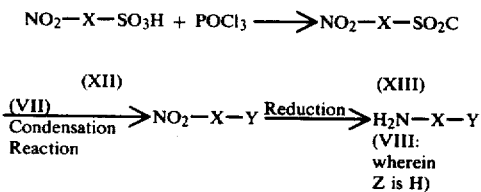

Process II

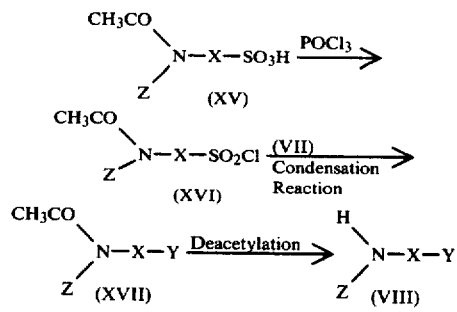

wherein X, Y and Z each has the same meaning as defined in the formula (I).

In order to obtain a compound represented by the formula (XIII) or (XVI) from a compound represented by the formula (XII) or (XV), a chlorinating agent such as those described in the preparation of the compound of the formula (VI) described above can be used. In this case, the reaction is preferably carried out in the presence of an N,N-di-substituted carbon amide.

The condensation reaction of the sulfonyl chloride represented by the formula (XIII) or (XVI) and an o- or p-hydroxyarylamine having a ballast group bonded thereto represented by the formula (VII) to obtain a compound of the formula (XIV) or (XVII) is preferably carried out in the presence of a basic compound as described with respect to the reaction of the compound of the formula (VI) with the compound of the formula (VII) or (VIII).

Typical examples of reduction reactions for obtaining a compound represented by the formula (VIII) from a compound of the formula (XIV) include a catalytic hydrogenation (e.e., using Raney nickel, palladium-carbon or charcoal as a catalyst), a reduction wth iron powder, a reduction with hydrazine, etc.

Typical examples of reactions for obtaining a compound represented by the formula (VIII) from a compound of the formula (XVII) include heating with hydrochloric acid, heating with a concentrated aqueous alkaline solution, etc.

Typical synthesis examples of the dye releasing redox compounds according to the present invention and the intermediates thereof are illustrated in detail below.

SYNTHESIS OF INTERMEDIATES

Synthesis Example 1

Synthesis of 2,5-dimethyl-4-aminobenzenesulfonic acid

To 121 g of 2,5-dimethylaniline, 100 g of sulfuric acid (d=1.84) was gradually added dropwise and the mixture was heated at 220° to 230° C. on an oil bath for 5 hours. To the reaction mixture, 2 l of an 1 N aqueous potassium hydroxide solution was added and the mixture was stirred with heating. After filtering the mixture while hot, 1 kg of hydrochloric acid (d=1.18) was added to the filtrate. The crystals thus precipitated were collected by filtration and washed with 1 l of acetone.

Yield: 137 g, Melting Point: above 200° C.

Synthesis Example 2

Synthesis of 2,4-dimethoxy-5-aminobenzenesulfonic acid (1) Synthesis of 2,4-dimethoxybenzenesulfonic acid To a solution prepared by adding 57 ml of chlorosulfonic acid to 250 ml of chloroform, was added dropwise 50 g of 1,3-dimethoxybenzene at a temperature below 5° C. with stirring. After stirring at 5° C. for 30 minutes, the crystals thus-precipitated were collected by filtration and washed with 100 ml of chloroform.

Yield: 80 g, Melting Point: above 200° C.

(2) Synthesis of 2,4-dimethoxy-5-nitrobenzenesulfonic acid

To a solution prepared by adding 90 g of 2,4-dimethoxybenzenesulfonic acid obtained in Step (1) above to 200 ml of chloroform, was added 225 ml of nitric acid (d=1.42) with stirring. The reaction mixture was stirred at 25° to 30° C. for 2 hours and 300 ml of acetonitrile was added thereto. The crystals thus-precipitated were collected by filtration and washed with 100 ml of acetonitrile.

Yield: 55 g, Melting Point: above 200° C.

(3) Synthesis of 2,4-dimethoxy-5-aminobenzenesulfonic acid

A mixture solution prepared by adding 15 g of reduced iron, 0.3 g of ammonium chloride and 50 ml of isopropyl alcohol to 10 g of 2,4-dimethoxy-5-nitrobenzenesulfonic acid obtained in Step (2) above, was heated at 70° to 80° C. on a water bath with stirring, and 50 ml of water was added thereto. After stirring at 80° C. for 1 hour, the mixture was filtered while hot. To the filtrate, 20 ml of hydrochloric acid (d=1.18) was added. The crystals thus-precipitated were collected by filtration and washed with 20 ml of iropropyl alcohol.

Yield: 5.7 g, Melting Point: above 200° C.

SYNTHESIS OF DYE RELEASING REDOX COMPOUNDS

Synthesis Example 1

Synthesis of Compound 1

(1) Synthesis of 2-(N-tert-butylsulfamoyl)-4-(2,5-dimethyl-4-sulphophenylazo)-5-methanesulfonamido-1-naphthol To a solution containing 4 g of sodium hydroxide and 100 ml of water, 10.5 g of 2,5-dimethyl-4-aminobenzenesulfonic acid and 3.85 g of sodium nitrite were added with stirring and completely dissolved. The solution was poured to 100 ml of 2 N hydrochloric acid at a temperature below 5° C. and the mixture was stirred under cooling with ice for 30 minutes.

To 5 g of sodium hydroxide, were added 50 ml of water, 200 ml of methyl alcohol and 18.6 g of 2-(N-tert-butylsulfamoyl)-5-methanesulfonamido-1-naphthol and completely dissolved. To the solution thus prepared, the above-described diazo solution was added at a temperature below 10° C. with stirring. After stirring under cooling with ice for 1 hour, 20 ml of hydrochloric acid (d=1.18) was added thereto. The crystals thus-precipitated were collected by filtration and wshed with 100 ml of an aqueous saturated sodium chloride solution.

Yield: 27 g, Melting Point: above 200° C.

(2) Synthesis of 2-(N-tert-butylsulfamoyl)-4-(2,5-dimethyl-4-chlorosulfonylphenylazo)-5-methanesulfonamido-1-naphthol To a solution containing 25 g of the naphthol compound obtained in Step (1) above, 180 ml of acetonitrile and 35 ml of phosphorus oxychloride, 15 ml of N,N-dimethylacetamide was added dropwise at a temmperature below 60° C. with stirring. The mixture was stirred at 60° C. for 3 hours and was poured into 800 ml of ice water. The cyrstals thus-precipitated were collected by filtration and washed with 100 ml of acetonitrile.

Yield: 19 g, Melting Point: 199° to 204° C.

(3) Synthesis of Compound 1

To 46.5 g of the naphthol compound obtained in Step (2) above, 31 g of 2-amino-4-hexadecyloxy-5-methylphenol hydrochloride, 200 ml of N,N-dimethylacetamide and 35 ml of pyridine were added. The mixture was stirred at 25° C. for 5 hours and to the mixture, 800 of a 75% aqueous methanol solution was added. The crystals thus-precipitated were collected by filtration and washed with 400 ml of a 90% aqueous methanol solution with foiling.

Yield: 60 g, Melting Point: 165° to 170° C.

Synthesis Example 2

Synthesis of Compound 7

(1) Synthesis of 2-(N-tert-butylsulfamoyl)-4-(3,5-dimethyl-4-sulfophenylazo)-5-methanesulfonamido-1-naphthol To a solution containing 4 g of sodium hydroxide and 100 ml of water, 10.5 g of 2,6-dimethyl-4-aminobenzenesulfonic acid and 3.85 g of sodium nitrite were added with stirring and completely dissolved. The solution was poured to 100 ml of 2 N hydrochloric acid at a temperature below 5° C. and the mixture was stirred under cooling with ice for 30 minutes.

To 50 ml of a 5% aqueous solution of sodium hydroxide, 200 ml of methyl alcohol and 18.6 g of 2-tert-butylsulfamoyl-5-methanesulfonamido-1-naphthol were added and completely dissolved. To the solution thus prepared, the above-described diazo solution was added dropwise at a temperature below 10° C. with stirring. After stirring the mixture for 1 hour under cooling with ice, 20 ml of hydrochloric acid (d=1.18) was added thereto. The crystals thus-precipitated were collected by filtration and washed with 100 ml of a saturated aqueous sodium chloride solution.

Yield: 32 g, Melting Point: above 200° C.

(2) Synthesis of 2-(N-tert-butylsulfamoyl)-4-(3,5-dimethyl-4-chlorosulfonylphenylazo)-5-methanesulfonamido-1-naphthol To a solution containing 30 g of the naphthol compound obtained in Step (1) above, 250 ml to acetonitrile and 45 ml of phosphorus oxychloride, 15 ml of N,N-dimethylacetamide was added dropwise at a temperature below 60° C. with stirring. The mixture was stirred at 60° C. for 3 hours and poured into 1 l of ice water. The cyrstals thus-precipitated were collected by filtration and washed with 100 ml of acetonitrile.

Yield: 23 g, Melting Point: 197° to 201° C.

(3) Synthesis of Compound 7

To 18 g of the compound obtained in Step (2) above, 12 g of 2-amino-4-hexadecyloxy-5-methylphenol hydrochloride, 90 ml of N,N-dimethylacetamide and 7 ml of pyridine were added. The mixture was stirred at 25° C. for 2 hours and to the mixture, 360 ml of a 75% aqueous methanol solution was added. The crystals thus-precipitated were collected by filtration and recrystallized from 40 ml of acetonitrile and 100 ml of methanol.

Yield: 18 g, Melting Point: 145° to 150° C.

The compounds of the present invention are generally used in amounts of about $2.5 \times 10^{-5}$ to $2.5 \times 10^{-3}$ mol/m$^2$ and preferably about $1 \times 10^{-4}$ to $1 \times 10^{-3}$ mol/m$^2$.

In the reproduction of natural color by subtractive color photography, a light-sensitive element comprising at least two combinations of each of a silver halide emulsion having a selective spectral sensitivity in a certain wavelength region and a compound capable of providing a dye having a selective spectral absorption at the same wavelength region as the emulsion is used. In particular, a light-sensitive element comprising a combination of a blue-sensitive silver halide emulsion and a compound capable of providing a yellow dye, a combination of a green-sensitive silver halide emulsion and a compound capable of providing a magenta dye, and a combination of a red-sensitive silver halide emulsion and a compound capable of providing a cyan dye is useful. As a matter of course, diffusible dye-releasing redox compounds of the present invention can be used as the above-described compounds capable of providing the dye. These combinations of units of the silver halide emulsions and the dye providing compounds may be coated on a support as layers in a face-to-face relationship or may be coated on a support as a layer containing a mixture of particles of the silver halides and the dye providing compounds in a binder.

In a preferred multilayer structure, a blue-sensitive silver halide emulsion layer, a green-sensitive silver halide emulsion layer and a red-sensitive silver halide emulsion layer are positioned in this order from the side of incident light of exposure and, in particular, it is desirable for a yellow filter layer to be positioned between the blue-sensitive silver halide emulsion layer and the green-sensitive silver halide emulsion layer when a highly sensitive silver halide emulsion containing silver iodide is used. The yellow filter layer usually contains a dispersion of yellow colloidal silver, a dispersion of an oil-soluble yellow dye, an acid dye mordanted to a basic polymer, or a basic dye mordanted to an acid polymer.

It is advantageous for the silver halide emulsion layers to be separated from each other by an interlayer. The interlayer acts to prevent the occurrence of undesirable interactions between the differently color-sensitized silver halide emulsion layers. The interlayer employed in such a case is usually composed of a hydrophilic polymer such as gelatin, polyacrylamide, a partially hydrolyzed product of polyvinyl acetate, etc., a polymer containing fine pores formed from a latex of a hydrophilic polymer and a hydrophobic polymer, e.g., as described in U.S. Pat. No. 3,625,685, or a polymer whose hydrophilic property is gradually increased by the processing composition, such as calcium alginate, as described in U.S. Pat. No. 3,384,483, individually or as a combination thereof.

The silver halide emulsions which can be used in the present invention are a dispersion of silver halide, silver bromide, silver chlorobromide, silver iodobromide, silver chloroiodobromide or a mixture thereof in a hydrophilic colloid. The halide composition of the silver halide is selected depending on the purpose of using the photographic materials and the processing conditions for the photographic materials, but a silver bromide emulsion, a silver iodobromide emulsion or a silver chloroiodobromide emulsion having a halide composition of 0 to 10 mol % iodide, less than 30 mol % chloride, and the rest bromide is particularly preferred.

The silver halide emulsions used in the present invention can possess, if desired, a color sensitivity expanded with a spectral sensitizing dye or dyes.

The dye releasing redox compound used in this invention can be dispersed in a hydrophilic colloid using various techniques, depending on the type of dye releasing redox compound. For example, when the dye releasing redox compound has a dissociable group such as a sulfo group or a carboxy group, the dye releasing redox compound can be added to an aqueous solution of a hydrophilic colloid as a solution in water or as an aqueous alkaline solution thereof. On the other hand, when the dye releasing redox compound is sparingly soluble in aqueous medium but is readily soluble in organic solvents, the dye releasing redox compound is first dissolved in an organic solvent and then the solution is finely dispersed in an aqueous solution of a hydrophilic colloid with stirring. Such a dispersing method is described in detail in, for example, U.S. Pat. Nos. 2,322,027, 2,801,171, 2,949,360 and 3,396,027.

To stabilize the dispersion of the dye releasing redox compound and also to promote dye image formation, it is advantageous to incorporate the dye releasing redox compound into the light-sensitive element as a solution in a solvent which is substantially insoluble in water and has a boiling point of higher than about 200° C. at normal pressure. Examples of suitable high boiling solvents which can be used for this purpose are aliphatic esters such as triglycerides of higher fatty acids, dioctyl adipate, etc., phthalic acid esters such as di-n-butyl phthalate, etc.; phosphoric acid esters such as tri-o-cresyl phosphate, tri-n-hexyl phosphate, etc., amides such as N,N-diethyllaurylamide, etc.; and hydroxy compounds such as 2,4-di-n-amylphenol. Furthermore, to stabilize the dye releasing redox compound and to promote dye image formation, it is also advantageous to incorporate an oleophilic polymer into the light-sensitive sheet together with the dye releasing redox compound. Examples of suitable oleophilic polymers which can be used for this purpose are shellac, a phenol-formaldehyde condensate, poly-n-butyl acrylate, a copolymer of n-butyl acrylate and acrylic acid, an interpolymer of n-butyl acrylate, styrene, and methacryamide, etc.

Such an oleophilic polymer may be dissolved in an organic solvent together with the dye releasing redox compound and then may be dispersed in a photographic hydrophilic colloid such as gelatin as a solution thereof or may be added to a dispersion in a hydrophilic colloid of the dye-releasing redox compound as the hydrosol of a polymer prepared by emulsion polymerization, etc.

In general, the dispersion of the dye releasing redox compound is generally carried out using a large shearing stress. For instance, a high speed mixer, a colloid mill, a high pressure milk homogenizer, a high pressure homogenizer as described in British Pat. No. 1,304,264, an ultrasonic emulsifying device, etc., are suitably used.

The dispersion of the dye releasing redox compound can be greatly promoted by using a surface active agent as an emulsification aid. Examples of suitable surface active agents useful for dispersion of the dye releasing redox compound used in this invention are sodium triisopropylnaphthalenesulfonate, sodium dinonylnaphthalenesulfonate, sodium p-dodecylbenzenesulfonate, sodium dioctylsulfosuccinate, sodium cetylsulfate, and the anionic surface active agents as described in Japanese Patent Publication No. 4293/1964 British Pat. No. 1,138,514. The use of these anionic surface active agents and the higher fatty acid ester of anhydrohexitol exhibits particularly excellent emulsifying capability as disclosed in U.S. Pat. No. 3,676,141. Furthermore, the dispersing methods disclosed in Japanese Patent Publication No. 13837/1968 and U.S. Pat. Nos. 2,992,104, 3,044,873, 3,061,428 and 3,832,173 can be effectively employed for dispersing the dye releasing redox compound used in this invention.

The light-sensitive sheet of the present invention is prepared by coating directly or indirectly at least one light-sensitive silver halide photographic emulsion layer with the dye releasing redox compound according to the present invention associated therewith onto a substantially planar material which does not undergo large dimensional changes during processing. Examples of suitable supports which can be used are cellulose acetate films, polystyrene films, polyethylene terephthalate films, polycarbonate films, etc., as are used as supports for conventional photographic light-sensitive materials. Other examples of suitable supports are papers and papers laminated with a water-impermeable polymer such as polyethylene.

The methods described in Japanese Patent Applications (OPI) 114,424/1974 and 33,826/1973 and Belgian Pat. No. 788,268 can be employed as methods of forming diffusion transfer color photographic images by using a dye releasing redox compound. These image forming methods can be effectively used with the dye releasing redox compound according to the present invention.

One embodiment of a series of steps for obtaining color diffusion transfer photographic images using a dye-releasing redox compound according to the present invention is described below.

(A) A light-sensitive sheet comprising a support having coated thereon at least one light-sensitive silver halide emulsion layer with the dye-releasing redox compound according to the present invention associated therewith (hereinafter referred to as light-sensitive element) is imagewise exposed.

(B) An alkaline processing composition is spread on the above-described light-sensitive silver halide emulsion layer whereby development of all light-sensitive silver halide emulsion layers in the presence of a developing agent for silver halide is conducted.

(C) As a result, an oxidation product of the developing agent produced in proportion to the amount of exposure cross-oxidizes the dye-releasing redox compound.

(D) The above-described oxidation product of the dye-releasing redox compound splits to release a diffusible dye.

(E) The released diffusible dye imagewise diffuses to form a transferred image on an image-receiving layer (directly or indirectly) adjacent the light-sensitive silver halide emulsion layer.

In the above-described process, any silver halide developing agents which can cross-oxidize the dye-releasing redox compound can be used. These developing agents may be incorporated into the alkaline processing composition or may be incorporated into appropriate photographic layers of the light-sensitive element. Specific examples of suitable developing agents which can be used in this invention are, for example, hydroquinones; aminophenols such as N-methylaminophenol; pyrazolidones such as phenidone 1-phenyl-3-pyrazolidone, dimezone (1-phenyl-4,4-dimethyl-3-pyrazolidone), 1-phenyl-4-methyl-4-oxymethyl-3-pyrazolidone; phenylenediamines such as N,N-diethyl-p-phenylenediamine, 3-methyl-N,N-diethyl-p-phenylenediamine, 3-methoxy-N-ethoxy-p-phenylenediamine; etc.

Of the above-indicated developing agents, black-and-white developing agents having the capability, in general, of reducing the occurrence of stains in image-receiving layers are particularly preferred in comparison with color developing agents such as phenylenediamines.

When the dye-releasing redox compound according to this invention is used, the transferred image is a negative image and the image remaining in the photosensitive layer is a positive image where a conventional surface latent image forming type emulsion is used without using a reversal mechanism. On the other hand, where a direct positive silver halide emulsion (including an emulsion which can provide a direct reversal positive image by fogging during development after exposure, for example, an internal latent image forming type silver halide emulsion or a solarization type silver halide emulsion) is employed as the silver halide emulsion in the above-described case, the transferred image formed in the image-receiving layer is a positive image.

Solarization type silver halide emulsions as described in C. E. K. Mees, *The Theory of the Photographic Process*, pages 261-297, Macmillan Co., New York (1942) can be used in this invention. These solarization type silver halide emulsions may be prepared using methods described in, for example, British Pat. Nos. 443,245 and 462,730 and U.S. Pat. Nos. 2,005,837, 2,541,472, 3,367,778, 3,501,305, 3,501,306 and 3,501,307.

Also, internal latent image forming type silver halide emulsions as described in, for example, U.S. Pat. No. 2,592,250, can be advantageously used in this invention. Typical examples of fogging agents which can be used for preparing this type of silver halide emulsion are the hydrazines described in U.S. Pat. Nos. 2,588,982 and 2,563,785, the hydrazide and hydrazone described in U.S. Pat. No. 3,227,552, and the quaternary salt compounds described in British Pat. No. 1,283,835, Japanese Patent Publication No. 38164/1974, and U.S. Pat. Nos. 3,734,738, 3,719,494 and 3,615,615. Furthermore, the DIR reversal silver halide emulsion system as described in U.S. Pat. Nos. 3,227,551, 3,227,554 and 3,364,022 or the reversal silver halide system using dissolution physical development as described in British Patent 904,364 can be employed in the case of using the dye-releasing redox compound of this invention.

The dye releasing redox compounds having an absorption in a shorter wavelength region than those represented by the general formula (I) which can be used in the present invention, for example, Compounds 6, 8 and 12, etc. can be used together with a dye releasing redox compound having an absorption in a longer wavelength region. As compounds to be used together with these compounds according to the present invention, compounds which provide a transferred dye having an absorption maximum at about 550 to 600 nm are desirable.

Also, the dye releasing redox compounds having an absorption in a longer wavelength region than those represented by the general formula (I) which can be used in the present invention, for example, Compounds 1 to 5, 7, 9 to 11, 13, 16 and 26, etc. can be used together with a dye releasing redox compound having an absorption in a shorter wavelength region. As compounds to be used together with these compounds according to the present invention, compounds which provide a transferred dye having an absorption maximum at about 520 to 545 nm are desirable.

Specific examples of the compounds which release a transferred dye having an absorption maximum at 520 to 545 nm are illustrated below.

Compound A-1

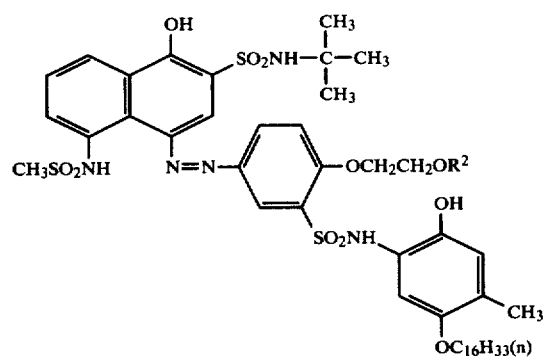

wherein $R^2$ is $CH_3$.

Compound A-2

Same compounds as Compound A-1 except $R^2$ is $C_2H_5$.

Compound A-3
Compound A-5
Same compound as Compound A-4 except $R^3$ is $CH_3$.
Compound A-6
Same compound as Compound A-4 except $R^3$ is n-$C_4H_9$.
Compound A-7
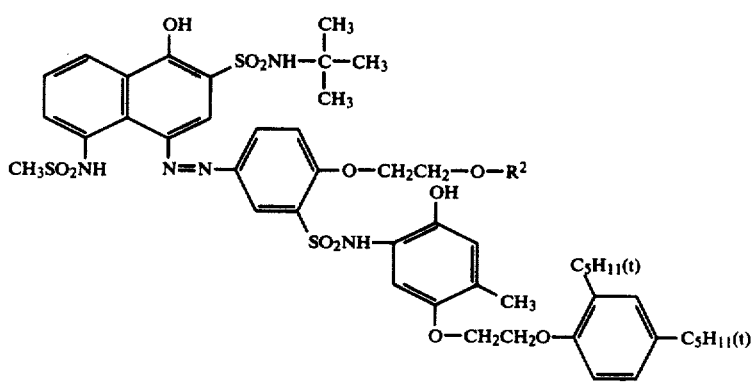
wherein $R^2$ is $CH_3$.
Compound A-8
Same compound as Compound A-7 except $R^2$ is $C_2H_5$.
Compound A-9
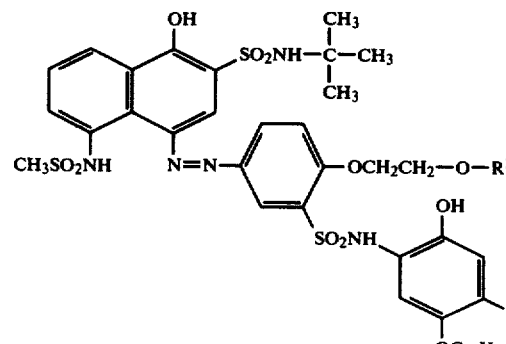
wherein $R^2$ is $CH_3$.
Compound A-10
Same compound as Compound A-9 except $R^2$ is $C_2H_5$.
Compound A-4
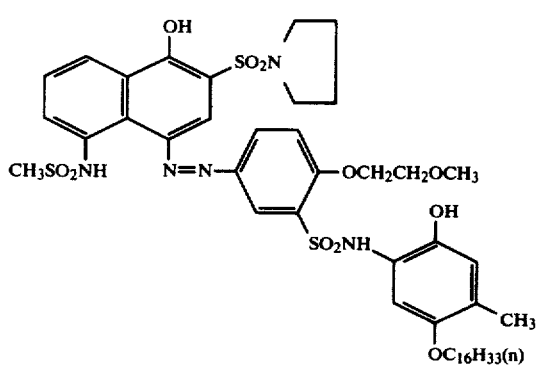
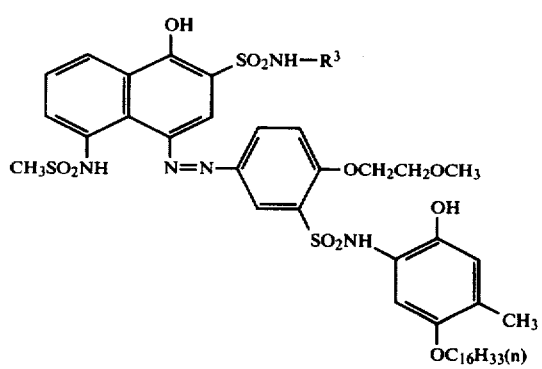
wherein $R^3$ is H.

Compound A-11
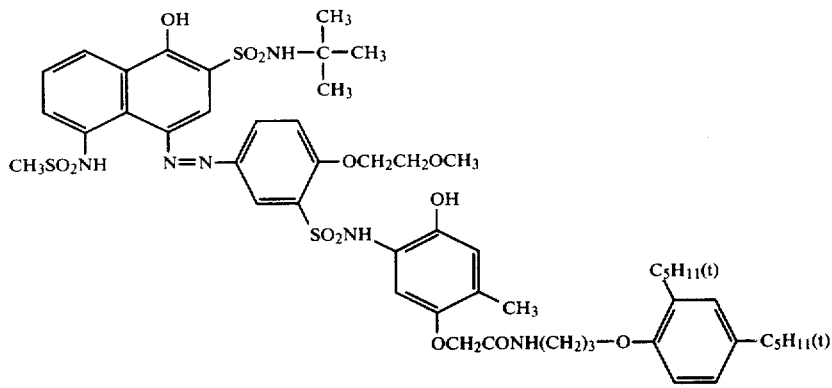
Compound A-12
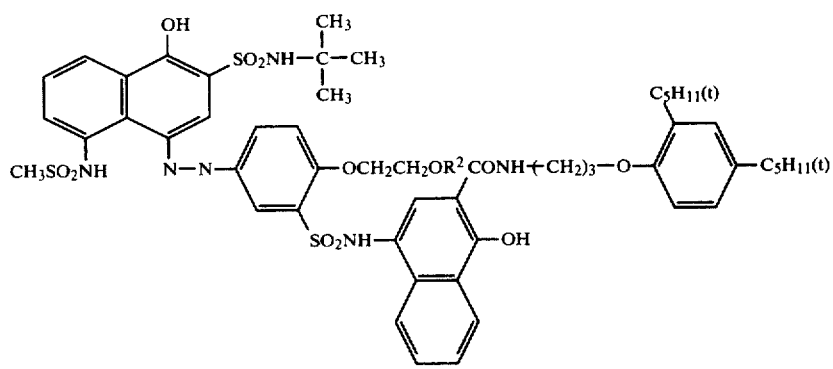
wherein R² is CH₃.
Compound A-13
Same compound as Compound A-12 except $R^2$ is $C_2H_5$.
Compound A-14
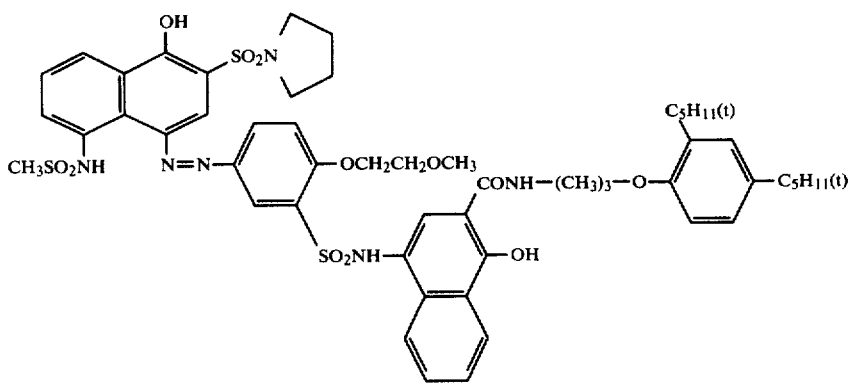

Compound A-15
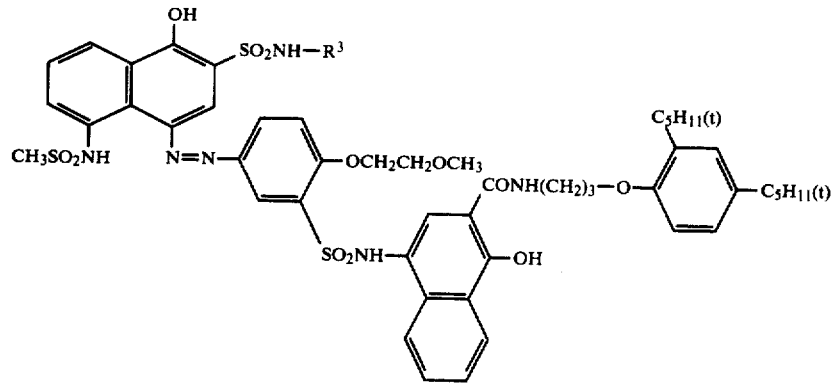
wherein R³ is H.
Compound A-16
Same compound as Compound A-15 except R³ is CH₃.
Compound A-17
Same compound as Compound A-15 except R³ is n—C₄H₉.
Compound A-18
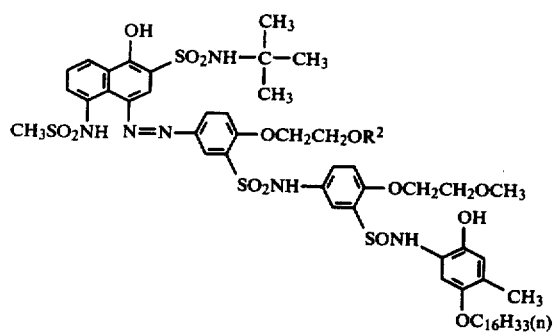
wherein R² is CH₃.
Compound A-19
Same compound as Compound A-18 except R² is C₂H₅.
Compound A-20
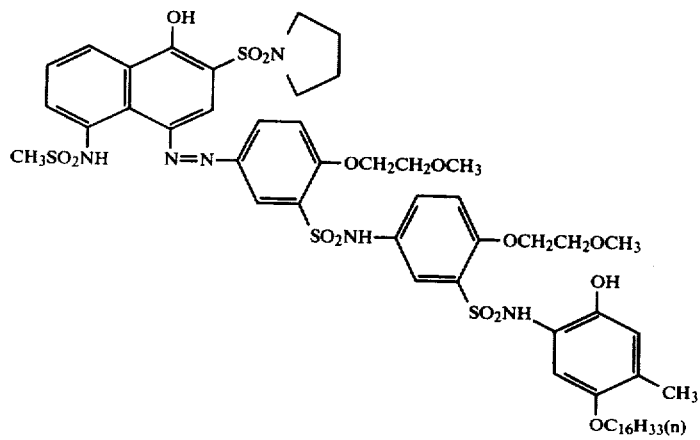

Compound A-21
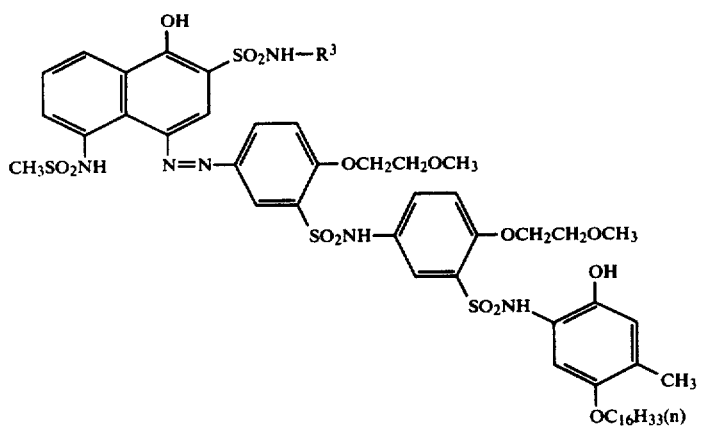
wherein $R^3$ is H.
Compound A-22
Same compound as Compound A-21 except $R^3$ is $CH_3$.
Compound A-23
Same compound as Compound A-21 except $R^3$ is n—$C_4H_9$.
Compound A-24
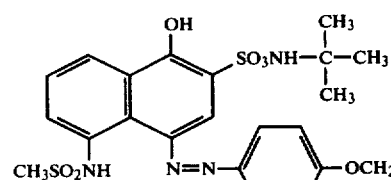
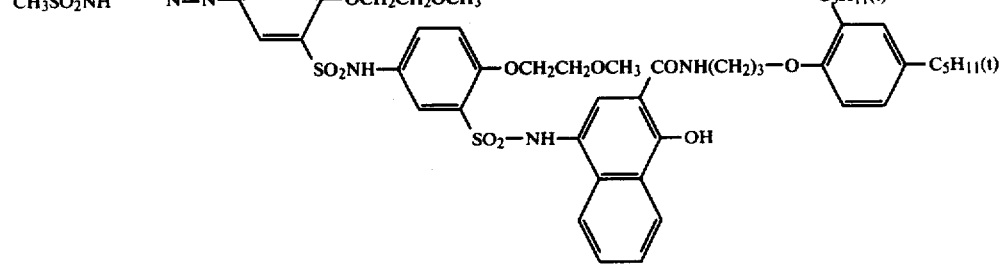
Compound A-25
Same compound as Compound A-4 except $R^3$ is $C_2H_5$.
Compound A-26
Same compound as Compound A-4 except $R^3$ is $CH_3OCH_2CH_2$.
Compound A-27
Same compound as Compound A-4 except $R^3$ is $(CH_3)_2CH$.
Compound A-28
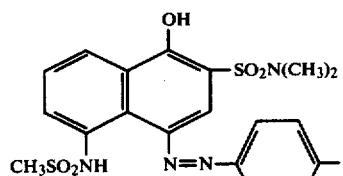
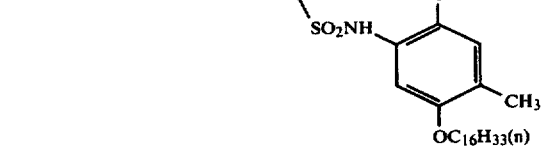

Compound A-29

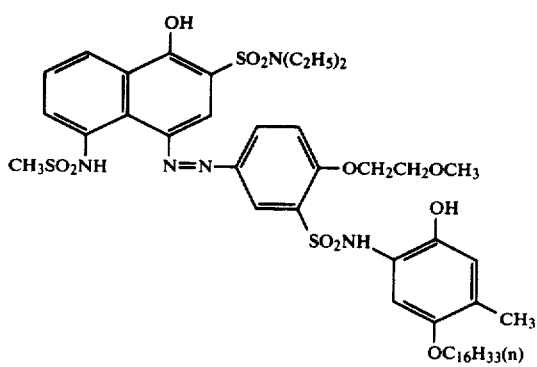

Compound A-30

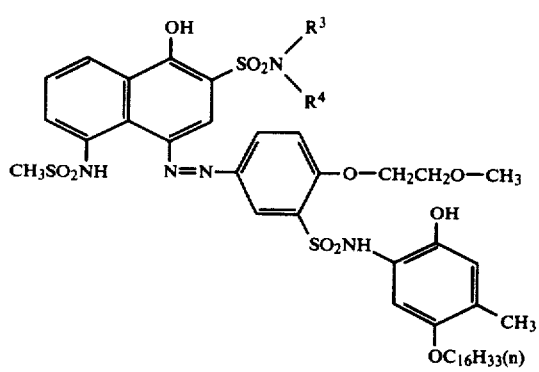

wherein R³ is H and R⁴ is cyclopentyl.

Compound A-31

Same compound as Compound A-30 except R³ is H and R⁴ is cyclohexyl.

Compound A-32

Same compound as Compound A-30 except R³ is H and R⁴ is

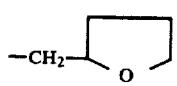

Compound A-33

Same compound as Compound A-30 except R³ is H and R⁴ is

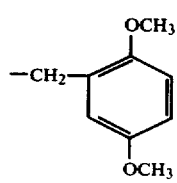

Compound A-34

Same compound as Compound A-30 except R³ is H and R⁴ is —CH₂—CH=CH₂.

Compound A-35

Same compound as Compound A-30 except R³ is H and R⁴ is

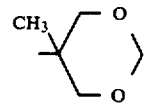

Specific examples of the compounds which release a transferred dye having an absorption maximum at 550 to 600 nm include dye releasing redox compounds 1 to 5, 7, 9, 10, 11, 13, 16 and 26, etc. described above according to the present invention.

A dye releasing redox compound to be used together with the compound according to the present invention can be incorporated into a layer containing the compound according to the present invention or into another layer. A dye releasing redox compound having an absorption in a longer wavelength region is preferably changed temporarily to a compound having an absorption in a short wavelength in a dispersion in view of color reproduction.

Preferred combinations and relative amounts are illustrated below.

(1) Compound 1 (60%) and Compound A-1 (40%).
(2) Compound 1 (60%) and Compound A-29 (40%).
(3) Compound 7 (50%) and Compound A-1 (50%).
(4) Compound 7 (50%) and Compound A-29 (50%).
(5) Compound 13 (50%) and Compound A-29 (50%).

It is necessary for the image-receiving element used in this invention in combination with the above-described light-sensitive element to have a mordanting layer comprising a mordant, such as the poly-4-vinyl-pyridine latex (in, preferably, polyvinyl alcohol) described in U.S. Pat. No. 3,148,061, the polyvinyl pyrrolidone described in U.S. Pat. No. 3,003,872, and the polymers containing quaternary ammonium salts as described in U.S. Pat. No. 3,239,337, individually or as a combination thereof. Also, the basic polymers as described in U.S. Pat. Nos. 2,882,156, 3,625,694 and 3,709,690 can be effectively used as the mordant for the image-receiving layer. Other examples of mordants which can be effectively used in this invention are described in U.S. Pat. Nos. 2,484,430, 3,271,147, 3,184,309, etc.

Preferably the light-sensitive sheet of this invention is capable of neutralizing the alkali carried in the processing composition. It is advantageous for this purpose for the light-sensitive sheet to include in a cover sheet or in an image-receiving element thereof a neutralizing layer containing an acid material in an amount sufficient to neutralize the alkali in the liquid processing composition, that is, containing an acid material at an area concentration higher than the equivalent of the alkali in the spread liquid processing composition. When a cover sheet having a neutralizing layer is used, the cover sheet can be superimposed on an image-receiving layer after such has been peeled from a light-sensitive element. Typical examples of preferred acid materials which can be used for this purpose are those described in U.S. Pat. Nos. 2,983,606, 2,584,030 and 3,362,819. The neutralizing layer may further contain a polymer such as cellulose nitrate, polyvinyl acetate, etc., and also the plasticizers as described in U.S. Pat. No. 3,557,237 in addition to the acid material. The acid material may be incorporated in the light-sensitive sheet in a microencapsulated form as described in Germany Patent Application (OLS) No. 2,038,254.

It is desirable for the neutralizing layer or the acid material-containing layer which can be used in this invention to be separated from the spread layer of the liquid processing composition by a neutralization rate controlling layer (or timing layer). Gelatin, polyvinyl alcohol, or the compounds described in U.S. Pat. Nos. 3,455,686, 4,009,030 and 3,785,815, British Pat. No. 1,514,367 and U.S. Pat. No. 4,123,275, Japanese Patent Application (OPI) Nos. 92002/1973, 64435/1974, 22935/1974 and 77333/1976, Japanese Patent Publication Nos. 15756/1969, 12676/1971 and 41214/1973, German Patent Application (OLS) Nos. 1,622,936 and 2,162,277, *Research Disclosure*, No. 151, 15162 (1976), etc., can be effectively used as the timing layer. The timing layer acts to retard the reduction in the pH of the liquid processing composition by the neutralizing layer until the desired development and transfer of dyes can be sufficiently accomplished.

Image-receiving elements are described in detail in, for example, Japanese Patent Application (OPI) No. 13285/1972, U.S. Pat. No. 3,295,970 and British Pat. No. 1,187,502.

The processing composition of the processing element used in this invention is a liquid composition containing the processing components necessary for developing silver halide emulsions and forming diffusion transfer dye images. The solvent of the processing composition is mainly water and contains, as the case may be, a hydrophilic solvent such as methanol, methyl Cellosolve, etc. The liquid processing composition contains alkali in an amount sufficient to maintain the necessary pH on developing the silver halide emulsion layers and for neutralizing acids (e.g., hydrohalic acids such as hydrobromic acid, etc., and carboxylic acids such as acetic acid, etc.) formed during development and dye image formation. Examples of suitable alkalis are hydroxides or salts of ammonia, alkali metals or alkaline earth metals or amines, such as lithium hydroxide, sodium hydroxide, potassium hydroxide, an aqueous dispersion of calcium hydroxide, tetramethylammonium hydroxide, sodium carbonate, trisodium phosphate, diethylamine, etc. It is desirable for the liquid processing composition to contain an alkaline material in a concentration such that the pH thereof can be maintained at above about 12, in particular, above 14 at room temperature. Further preferably, the liquid processing composition contains a hydrophilic polymer such as high molecular weight polyvinyl alcohol, hydroxyethyl cellulose, sodium carboxymethyl cellulose, etc. These polymers contribute toward increasing viscosity of the liquid processing composition above about 1 poise, preferably to several hundreds (500 or 600) to 1,000 poises, at room temperature, which facilitates the uniform spreading of the processing composition at development as well as the formation of a non-fluid film when the aqueous medium has diffused into the light-sensitive element and the image-receiving element during processing thereby concentrating the processing composition, which results in assisting unification of all of the elements after processing. The polymer film also contributes toward preventing coloring components from transferring into the image-receiving layer to stain the dye images formed after the formation of the diffusion transfer dye image is substantially completed.

As the case may be, it is advantageous for the liquid processing composition to further contain a light shielding material such as $TiO_2$, carbon black, a pH indicating dye, etc., or the desensitizer as described in U.S. Pat. No. 3,579,333 for preventing the silver halide emulsion from being fogged by outside light during processing. Furthermore, the liquid processing composition used in this invention may contain a development inhibitor such as benzotriazole.

It is preferred for the above-described processing composition to be retained in a rupturable container as described in U.S. Pat. Nos. 2,543,181, 2,643,886, 2,653,732, 2,723,051, 3,056,491, 3,056,492, 3,152,515, etc.

The light-sensitive sheet of the present invention can be a photographic film unit which has a construction such that after imagewise exposure, the processing of the film unit is performed by passing the film unit through a pair of juxtaposed pressure-applying members comprises:

(1) a support,
(2) a light-sensitive element as described above,
(3) an image-receiving element as described above,
(4) a processing element as described above, and
(5) a developing agent (which can be incorporated into the processing element or the light-sensitive element).

One embodiment of the superimposed and integral type film unit to which the present invention is most preferably applicable is disclosed in Belgian Pat. No. 757,959. According to this embodiment, the film unit is prepared by coating on a transparent support an image-receiving layer, a substantially opaque light reflective layer (for example, a $TiO_2$-containing layer and a carbon black-containing layer), and a single or a plurality of light-sensitive layers as described above, in this order, and further superimposing a transparent cover sheet on the light-sensitive layer in a face-to-face relationship. A rupturable container retaining an alkaline processing composition having incorporated therein an opacifying agent for light shielding such as, for example, carbon black, is disposed adjacent to and between the uppermost layer of the above-described light-sensitive element and the transparent cover sheet. The film unit is imagewise exposed in a camera through the transparent cover sheet and then the rupturable container retaining the alkaline processing composition is ruptured by the pressure-applying members when the film unit is withdrawn from the camera to spread uniformly the processing composition containing the opacifying agent between the light-sensitive layer and the cover sheet, whereby the film unit is shielded from light in a sandwich form and development proceeds in a light place.

In these embodiments of the film units, the neutralization mechanism as described above is preferably incorporated therein. In particular, the neutralizing layer is preferably positioned in the cover sheet and, further, the timing layer is positioned on the side toward where the processing solution is to be spread, if desired.

Moreover, other useful embodiments of the superimposed and integral type of film units wherein the dye releasing redox compound of this invention can be used are described in, for example, U.S. Pat. No. 3,415,644, 3,415,645, 3,415,646, 3,647,847, and 3,635,707 and German Patent Application (OLS) No. 2,426,980.

The effects and advantages which can be obtained according to the present invention are described below.

Firstly, color images having less light-fading are obtained because of the superiority in the light fastness of the dyes released.

Secondly, color images with high quality are obtained when the dye-releasing redox compound according to the present invention is used together with other redox compounds of good hue, since the hue of the dyes released is excellent and does not vary with changes of pH.

Thirdly, the amount of dyes remaining at exposed areas in light-sensitivity elements is very small, since the transferability of the dye released is excellent. Therefore, it is effective to obtain negative color images composed of the unreacted dye releasing redox compound which are obtained by stripping off the light-sensitive element and subjecting it to bleach processing (i.e., the negative can be easily used.)

Fourthly, the dyes released are hardly subjected to fading in a dark place due to a vinyl monomer such as acrylic acid or butyl acrylate which is present in a neutralizing length.

REFERENCE EXAMPLE

Dye compound A which is released from Compound 1 described above was dissolved in N,N-dimethylformamide (DMF) to prepare a $10^{-3}$M solution. 0.25 ml of the solution was diluted with 11.5 ml of DMF and a mixture of 1.25 ml of a $10^{-1}$M DMF solution of butyl acrylate and 12.5 ml of a buffer having a pH of 5.05 (Britton-Robinson Buffer) was added thereto. The solution was allowed to stand at room temperature (25°–29° C.) and the decrease of absorbance at a maximum absorption wavelength in a visible region was measured. From the values measured the remaining rate of Dye Compound A was determined and assuming that the decrease of dye A can be shown by a pseudo first other equation, a reaction rate constant of the pseudo first under reaction, i.e., k, was determined.

In a similar manner, k was determined with respect to Dye Compound B, C and D released from Compounds 6, 10 and 12, respectively.

Also, k was determined in a similar manner with respect to Dye Compound E which does not have any electron-donating group in the azo component thereof and Dye Compound F which has one electro-donating group in the azo component thereof for comparison. The results obtained are shown in Table 1.

TABLE 1

Reaction of Released Dye Compound with Butyl Actylate

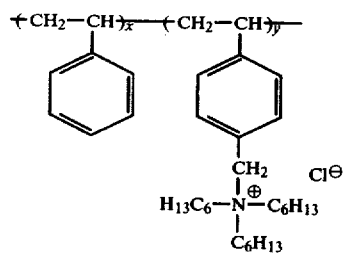

| Due Compound | $R^{12}$ | $R^{13}$ | $R^{14}$ | k(day$^{-1}$) |
|---|---|---|---|---|
| A | —CH$_3$ | —SO$_2$NH$_2$ | —CH$_3$ | 0.025 |
| B | —CH$_3$ | —CH$_3$ | —SO$_2$NH$_2$ | 0.033 |
| C | —OCH$_3$ | —SO$_2$NH$_2$ | —OCH$_3$ | 0.032 |
| D | —OCH$_3$ | —OCH$_3$ | —SO$_2$NH$_2$ | 0.012 |
| Comparison Dye Compound E | —H | —SO$_2$NH$_2$ | —H | 0.098 |
| Comparison Dye Compound F | —H | —SO$_2$NH$_2$ | —CH$_3$ | 0.099 |

TABLE 1-continued

Reaction of Released Dye Compound with Butyl Actylate

It is apparent from the results shown in Table 1 that Dye Compounds A to D have for superior fastness in comparison with Comparison Dye Compounds E and F. It is recognized that the presence of two electrodonating groups in the azo component is very important.

EXAMPLE

On a polyethylene terephthalate transparent support were coated the layers described below in the order listed to prepare a photographic light-sensitive sheet.
(1) Mordanting layer containing 3.0 g/m$^2$ of a mordant shown below:

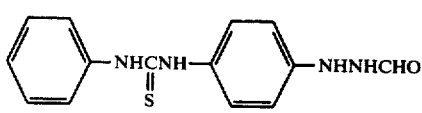

x : y = 50 : 50 and 3.0 g/m$^2$ of gelatin.
(2) White light reflective layer containing 20 g/m$^2$ of titanium oxide and 2.0 g/m$^2$ of gelatin.
(3) Light-shielding layer containing 2.7 g/m$^2$ of carbon black and 2.7 g/m$^2$ of gelatin.
(4) Layer containing 0.7 g/m$^2$ of the magenta dye releasing redox compound according to the present invention, 0.2 g/m$^2$ of diethyl laurylamide and 1.08 g/m$^2$ of gelatin.
(5) Layer containing a green-sensitive internal latent image type direct reversal silver iodobromide emulsion (halogen composition in the silver halide: 1 mol % of iodide; silver amount: 2.0 g/m$^2$; gelatin: 1.5 g/m$^2$), 0.08 mg/m$^2$ of a fogging agent represented by the following formula:

and 0.18 g/m$^2$ of sodium 5-pentadecylhydroquinone-2-sulfonate. (6) Layer containing 0.94 g/m$^2$ of gelatin.

Also, a processing solution and a cover sheet shown below were prepared.

Processing Solution:

| | |
|---|---|
| 1-phenyl-4-methyl-4-hydroxymethyl-3-pyrazolidione | 10 g |
| Methylhydroquinone | 0.18 g |
| 5-methylbenzotriazole | 4.0 g |
| Sodium Sulfite (anhydrous) | 1.0 g |
| Benzyl Alcohol | 1.5 ml |
| Carboxymethyl Cellulose Na Salt | 40.0 g |
| Carbon Black | 150 g |
| Potassium Hydroxide (28% aw. soln.) | 200 cc |
| $H_2O$ | 550 cc |

Each pressure rupturable container was filled with 0.8 g of the processing solution of the above composition.

Cover Sheet:

On a polyethylene terephthalate transparent support were coated a neutralizing acid polymer layer containing 15 g/m² of polyacrylic acid (a 10 wt % aq. soln. having viscosity of about 1,000 cp) and a neutralizing timing layer containing 3.8 g/m² of acetyl cellulose (hydrolysis of 100 g of acetyl cellulose forms 39.4 of acetyl groups), and 0.2 g/m² of a styrene-maleic anhydride copolymer (composition ratio: styrene: maleic anhydride = about 60:40, molecular weight: about 50,000) to prepare a cover sheet.

The above described cover sheet was superimposed on the above described light-sensitive sheet. Exposure was performed through a wedge having stepwise different density from the cover sheet side. Then, the processing solution described above was spread between both sheets in a thickness of 85 microns (the spreading was performed with the assistance of a pressure roller). The processing was carried out at 25° C. After processing, the transferred images were observed through the transparent support of the light-sensitive sheet. The maximum density and the minimum density of the magenta transferred images formed were measured one hour after the processing. Further, the remaining ratio of the magenta color image after allowing to stand the film unit thus processed for 7 days at 80° C. and 60% relative humidity (fading in a dark place) and the remaining ratio of magenta color image after exposing the film until thus processed to a light of 17,000 lux for 5 days using a fluorescent lamp fading tester (light-fading) were determined. The results thus obtained are shown in Table 2.

TABLE 2

| Magenta dye releasing redox compound | Maximum density | Minimum density | Fading in a dard (remaining ratio) | Light fading (remaining ratio) |
|---|---|---|---|---|
| Compound 7 of this invention | 1.95 | 0.31 | 79 | 92 |
| Compound 1 of this invention | 1.97 | 0.28 | 98 | 92 |
| Comparison compound* | 1.99 | 0.28 | 67 | 91 |

TABLE 2-continued

\* 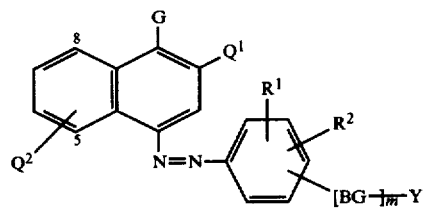

It is apparent from the results shown in Table 2 that the compounds according to the present invention are extremely superior to in view of the fading in a dark place in comparison with the comparison compound in which the azo component is not substituted with two methyl groups.

While the invention has beend described in detail and with reference to specific embodiments thereof, it will be apparent to one skilled in the art that various changes and modifications can be made therein without departing from the spirit and scope thereof.

What is claimed is:

1. A photographic light-sensitive sheet for a color diffusion transfer process wherein said sheet contains a neutralizing layer containing unreacted acrylate or acrylic acid, and said sheet comprises a support having thereon at least one light-sensitive silver halide emulsion layer having associate therewith a compound represented by the following general formula:

wherein $Q^1$ represents a hydrogen atom; a halogen atom; a sulfamoyl group represented by the formula $—SO_2NR^3R^4$ wherein $R^3$ represents a hydrogen atom or an alkyl group, $R^4$ represents a hydrogen atom or $R^{4a}$ wherein $R^{4a}$ represents an alkyl group, an aralkyl group or phenyl group, and $R^3$ and $R^4$ may combine directly or throught an oxygen atom to form a ring; a group represented by the formula $—SO_2R^5$ wherein $R^5$ represents an alkyl group or an aralkyl group; a carboxy group; a group represented by the formula $—COOR^6$ wherein $R^6$ represents an alkyl group or a phenyl group; or a group represented by the formula $—CONR^3R^4$ wherein $R^3$ and $R^4$ each has the same meaning as defined above; $Q^2$ is positioned at the 5- or the 8-position to the G group and represents a hydroxy group, a group represented by the formula $NHCOR^{4a}$ or a group represented by the formula $—NHSO_2R^{4a}$ wherein $R^{4a}$ has the same meaning as defined above; $R^1$ and $R^2$, which may be the same or different, each represents a methyl group, or a methoxy group; BG represents a bridging group; m represents 0 or 1; Y represents a redox center which functions to release a diffusible dye as a result of self cleavage upon oxidation, Y being ballasted; and G represents a hydroxyl group, a salt thereof, or a hydrolyzable acyloxy group represented by the formula

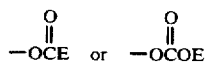

wherein E represents an alkyl group or an aryl group.

2. The light-sensitive sheet of claim 1, wherein said Y is a group represented by the following formula:

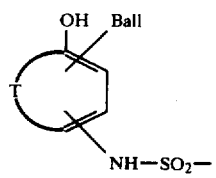

wherein Ball represents a bailast group; T represents the carbon atoms necessary to complete a benzene ring, which may be unsubstituted or substituted, or a naphthalene ring, which may be unsubstituted or substituted; the —NHSO$_2$— group is present at the o- or p-position to the hydroxy group; and when T represents the atoms necessary to complete a naphthalene ring, Ball can be bonded to either of the two rings.

3. The light-sensitive sheet of claim 1, wherein said group represented by R$^1$ and R$^2$ has 1 to 6 carbon atoms.

4. The light-sensitive sheet of claim 1, wherein R$^1$ and R$^2$, which may be the same or different, each represents a methyl group, an ethyl group, a methoxy group, an ethoxy group or a methoxyethoxy group.

5. The light-sensitive sheet of claim 1, wherein Q$^1$ is a sulfamoyl group represented by the formula —SO$_2$NR$^3$R$^4$ wherein R$^3$ is a hydrogen atom or an alkyl group having 1 to 8 carbon atoms, and R$^4$ represents a hydrogen atom, an alkyl group having 1 to 8 carbon atoms, an aralkyl group, or a phenyl group.

6. The light-sensitive sheet of claim 5, wherein said R$^3$ and R$^4$ each represents a hydrogen atom.

7. The light-sensitive sheet of claim 5, wherein one of said R$^3$ and R$^4$ represents a hydrogen atom and the other of said R$^3$ and R$^4$ represents an alkyl group having 1 to 4 carbon atoms.

8. The light-sensitive sheet of claim 1, wherein said m is 0.

9. The light-sensitive sheet of claim 1 wherein said bridging group BG is represented by the formula

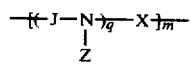

m and q each represents 0 or 1; J represents a divalent group selected from a sulfonyl group and a carbonyl group; Z represents a hydrogen atom or an alkyl group; X represents a divalent bonding group represented by the formula —A$_1$—(L)$_n$—(A$_2$)$_p$— wherein A$_1$ and A$_2$, which may be the same or different, each represents an alkylene group or an arylene group, L represents a divalent group selected from an oxy group, a carbonyl group, a carboxyamido group, a carbamoyl group, a sulfonamido group, a sulfamoyl group, a sulfinyl group and a sulfonyl group, and n and p each represents 0 or 1.

10. The light-sensitive sheet of claim 9, wherein R$^1$ and R$^2$, which may be the same or different, each represents an alkyl group having 1 to 4 carbon atoms or an alkoxy group having 1 to 4 carbon atoms; Q$^1$ represents a hydrogen atom or a sulfamoyl group represented by the formula —SO$_2$NR$^3$R$^4$ wherein R$^3$ and R$^4$, which may be the same or different, each represents a hydrogen atom or an alkyl group having 1 to 4 carbon atoms, or R$^3$ and R$^4$ combine directly or through an oxygen atom to form a 5- or 6-membered ring; Q$^2$ represents a hydroxy group or —NHSO$_2$R$^{4a}$ group wherein R$^{4a}$ is an alkyl group, an aralkyl group or an aryl group positioned at the 5-position to G; q is 0; Y-X represents Y-alkylene—SO$_2$—, Y—C$_6$H$_4$CH$_2$—SO$_2$— or Y- arylene —SO$_2$—; Y represents a sulfamoyl group as defined in claim 2; and m is 0 or 1.

11. The light-sensitive sheet of claim 10, wherein R$^1$ and R$^2$, which may be the same or different, each represents a methyl group, an ethyl group, a methoxy group, an ethoxy group or a methoxyethoxy group; and m is 0.

12. The light-sensitive sheet of claim 10, wherein Q$^1$ represents the sulfamoyl group.

13. The light-sensitive sheet of claim 12, wherein R$^1$ and R$^2$, which may be same or different, each represents a methyl group or a methoxy group.

14. The light-sensitive sheet of claim 9, wherein J represents a sulfonyl group.

15. The light-sensitive sheet of claim 9, wherein Z represents a hydrogen atom.

16. The light-sensitive sheet of claim 9, wherein q is 0.

17. The light-sensitive sheet of claim 9, wherein Y—X represents Y-alkylene-SO$_2$—, Y—C$_6$H$_4$CH$_2$—SO$_2$— or Y-arylene—SO$_2$—.

18. The light-sensitive sheet of claim 1 wherein Y represents an o- or p- hydroxyarylsulfamoyl group substituted with a ballast group.

19. The light-sensitive sheet of claim 18, wherein said ballast group contains a hydrophobic residue having 8 to 32 carbon atoms.

20. The light-sensitive sheet of claim 18, wherein said ballast group is represented by the formulae

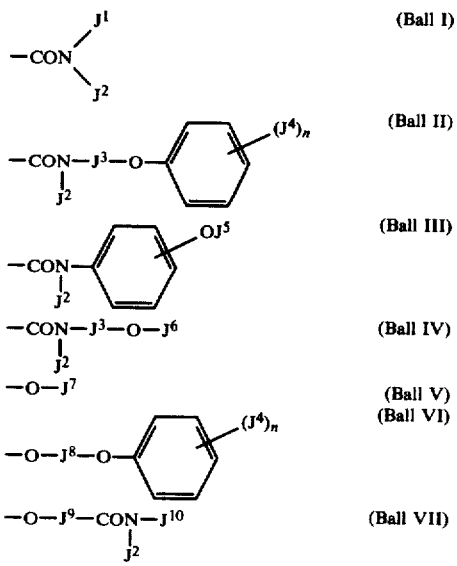

wherein J$^1$ represents a straight chain or branched chain alkyl group having 7 to 39 carbon atoms, J$^2$ represents a hydrogen atom or a straight chain or branched chain alkyl group having 1 to 39 carbon atoms, J$^3$ represents a straight chain or branched chain alkylene group having 1 to 10 carbon atoms, $J^4$ represents a hydrogen atom or a straight chain or branched chain alkyl group having 1 to 32 carbon atoms, $J^5$ represents a straight chain or branched chain alkyl group having 1 to 33 carbon atoms or a

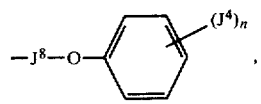

$J^6$ represents a straight chain or branched chain alkyl group having 1 to 37 carbon atoms, $J^7$ represents an alkyl group having 8 to 40 carbon atoms, $J^8$ represents a straight chain or branched chain alkylene group having 1 to 10 carbon atoms, $J^9$ represents a straight chain or branched chain alkylene group having 1 to 38 carbon atoms, $J^{10}$ represents an alkyl group having 1 to 38 carbon atoms or a

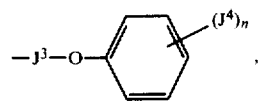

and n represents an integer of 1 to 5.

21. The light-sensitive sheet of claim 1, where said light-sensitive silver halide emulsion has associated therewith a dye releasing redox compound in addition to said compound represented by the general formula, which has an absorption maximum at a longer or shorter wavelength than said compound of the general formula.

22. The light-sensitive sheet of claim 21, wherein said additional dye releasing redox compound has an absorption maximum at about 550 to 600 nm.

23. The light-sensitive sheet of claim 21, wherein said additional dye releasing redox compound has an absorption maximum at about 520 to 540 nm.

24. A color diffusion transfer film unit comprising a support, the light-sensitive element of claim 1, an image receiving element, a processing element containing a developing agent in a rupturable container constructed such that by passing the film unit through a pair of juxtaposed pressure-applying members, said processing element is ruptured and dye images are formed in said image-receiving element.

25. The light-sensitive sheet of claim 1, which further comprises a cover sheet.

26. The light-sensitive sheet of claim 25, wherein said neutralizing layer is present in said cover sheet.

* * * * *